US006829070B2

United States Patent
Adachi

(10) Patent No.: US 6,829,070 B2
(45) Date of Patent: Dec. 7, 2004

(54) ELECTRO-OPTIC DEVICE AND ELECTRONIC DEVICE

(75) Inventor: Isao Adachi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/354,133

(22) Filed: Jan. 30, 2003

(65) Prior Publication Data

US 2003/0169474 A1 Sep. 11, 2003

(30) Foreign Application Priority Data

Feb. 27, 2002 (JP) ........................................ 2002-052386
Oct. 9, 2002 (JP) ........................................ 2002-296098

(51) Int. Cl.[7] .............................. G02F 1/03; G02F 1/07
(52) U.S. Cl. ........................ 359/245; 359/315; 359/354
(58) Field of Search .............................. 359/245, 247, 359/263, 250, 252–255, 315, 316, 318; 249/24, 113

(56) References Cited

U.S. PATENT DOCUMENTS 5,903,381 A * 5/1999 Watanabe et al. ........... 359/254
6,489,222 B2 * 12/2002 Yoshimoto ................... 438/486
6,521,912 B1 * 2/2003 Sakama et al. ............... 257/57

FOREIGN PATENT DOCUMENTS

| JP | A 4-240622 | 8/1992 |
| JP | A 7-191333 | 7/1995 |
| JP | 09-073088 | 3/1997 |
| JP | A 11-109369 | 4/1999 |
| JP | A 2000-66181 | 3/2000 |

* cited by examiner

Primary Examiner—Jordan M. Schwartz
Assistant Examiner—Jessica Stultz
(74) Attorney, Agent, or Firm—Oliff & Berridge, PLC

(57) ABSTRACT

The invention provides an electro-optic device capable of keeping the cell gap constant or substantially constant throughout the substrate surface regardless of the existence of a liquid crystal inlet. The electro-optic device of the invention has a TFT array substrate and an opposite substrate formed to sandwich an electro-optic material; a liquid crystal inlet to communicate the clearance sandwiched between the substrates with the exterior; and a plurality of columnar spacers scattered within the surfaces in parallel to the substrates to keep the clearance between the substrates at a predetermined thickness, the columnar spacers being disposed more densely in the vicinity of the liquid crystal inlet and more sparsely in the other area within the surfaces.

10 Claims, 16 Drawing Sheets

ELECTRO-OPTIC DEVICE AND ELECTRONIC DEVICE

BACKGROUND OF THE INVENTION

1. Field of Invention

The present invention relates to an electro-optic device and an electronic device. In particular, the invention relates to an electro-optic device utilizing columnar spacers to keep the interval of a clearance sandwiched by two substrates at a predetermined value, and an electronic device that incorporates such an electro-optic device.

2. Description of Related Art

Electro-optic devices, such as liquid crystal display device, are typically configured by sealing liquid crystals between two substrates formed with electrodes, wiring lines and elements. Such an electro-optic device is generally provided with spacers between the two substrates to keep the interval of the clearance sandwiched between the two substrates constant (about three to five micrometers, for example) throughout the substrate surfaces. In other words, the interval is a thickness of a layer formed of liquid crystals (hereinafter "cell gap"). The reason why the cell gap has to be kept constant is that the display characteristics, such as the light transmittance, the contrast ratio and the response speed are adversely affected if the cell gap is not kept constant, and display unevenness is likely to be generated in a bad or the worst case.

More specifically, spacers can be used that have a fine, approximately spherical shape, for example. Many such fine, approximately spherical spacers are uniformly scattered in the liquid crystals between two substrates in the case of direct view (large) liquid crystal display devices, such as a liquid crystal television and a monitor. On the other hand, in the case of small liquid crystal display devices to zoom a light bulb of a projector, the spacers are sometimes used in the form to be mixed in a sealing material to bond two substrates.

In addition, as another example of the spacers, those having a so-called columnar shape (hereafter "columnar spacer") can also be used (which are disclosed in JP-A-2000-66181). This is an example of spacers for use in the form that columnar members made of suitable organic materials stand together in large numbers at a proper interval on a substrate, which support two substrates by bearing force of the columns in the axial direction to keep the cell gap between the substrates constant. The proper interval is traditionally an extent that a single columnar spacer exists for a few to few tens of pixels, for example. In this connection, even in the case of using such columnar spacers, the approximately spherical spacers mixed in the sealing material (hereafter, the spacers in the sealing material are "gap materials") can be combined. Accordingly, the requirement to keep the cell gap constant can be satisfied better throughout the substrate surface.

Furthermore, the accuracy in the case of keeping the interval between the substrates constant is varied according to the difference in the twisted angle of liquid crystal molecules configuring the layer made of liquid crystals between the two substrates. For example, the requirement is about ±0.1 μm or less in the TN (Twisted Nematic) type that the twisted angle is 90 degrees, whereas the requirement is about ±0.3 μm or less in the STN (Super Twisted Nematic) type that the twisted angle is about 260 degrees.

SUMMARY OF THE INVENTION

However, the related art spacers are subject to the following problem. More specifically, the above liquid crystal display devices need to inject liquid crystals between two substrates, and thus a liquid crystal inlet to communicate the clearance sandwiched between the two substrates with the exterior is disposed. However, the existence of the liquid crystal inlet makes it difficult to keep the cell gap constant.

These circumstances will be described more specifically. First, the manufacture of the liquid crystal display device is largely performed as follows. The necessary features, such as electrodes, wiring lines and elements, are formed over both two substrates beforehand. Then, the sealing material mixed with the gap materials is coated around the circumference of at least one of the two substrates (sealing material coating process). Subsequently, the two substrates are bonded to each other (panel alignment process). Finally, liquid crystals are introduced into the clearance through the liquid crystal inlet by vacuuming.

In such a manufacturing processes, first, the sealing material cannot be coated over the portion to be the liquid crystal inlet in the sealing material coating process. This is because, when the sealing material is coated over the portion, liquid crystals cannot be introduced. In addition, the panel alignment process as a proper pressure is typically applied to two substrates.

Accordingly, the portion where the liquid crystal inlet exists has the cell gap that is smaller than that in the other portions. As described above, this is because two substrates are bonded as a proper pressure is utilized in the panel alignment process. Thus, the sealing material or gap materials in the sealing material generate a predetermined reaction to the substrates coming closer to each other as resisting the pressure. However, the sealing material and the gap materials are not in the portion where the liquid crystal inlet exists.

Here, even though the columnar spacers exist as the spacers between two substrates, the above problem cannot be eliminated. This is because the pressure in the panel alignment process is considerably great, and thus the reaction generated by the columnar spacers does not become equal to the reaction generated by the sealing material and the gap materials. This is more apparent by considering that the columnar spacers support the substrates by the bearing force of the columns in the axial direction as described above, that is, they support the substrate surfaces by so-called 'points', whereas the sealing material supports the substrate surfaces by surfaces, although the sealing material is only coated around the circumference of the substrates.

The invention may address the above and/or other problems. The invention provides an electro-optic device capable of keeping the cell gap constant throughout the substrate surfaces and even in of the liquid crystal inlet. The invention also provides an electronic device that incorporates such an electro-optic device.

In order to address or solve the above problem, a first electro-optic device of the invention has a pair of substrates formed to sandwich an electro-optic material, an inlet to communicate a clearance sandwiched by the pair of the substrates with the exterior, and a plurality of columnar spacers scattered within the surfaces of the pair of the substrates facing each other. The columnar spacers are disposed more densely in the vicinity of the inlet, and more sparsely beyond the vicinity of the inlet within the surfaces.

According to the first electro-optic device of the invention, first, the columnar keep the clearance sandwiched between the pair of the substrates at a predetermined thickness. In addition, an electro-optic material, such as liquid crystal, can be introduced from outside of the clearance to the clearance through the inlet. Then, the portion where the inlet exists is generally weaker in strength than other portions because of the formation of the port. Therefore, in the panel alignment process where a pair of substrates is bonded to each other, the portion where the inlet exists is more crushable than the other portions, and thus the cell gap becomes smaller.

Here, particularly in the invention, a plurality of the columnar spacers is disposed between a pair of substrates so as to be scattered within the surfaces in parallel to the pair of the substrates, and the columnar spacers are disposed more densely in the vicinity of the inlet and more sparsely beyond the vicinity of the inlet within the surfaces. Therefore, the reaction caused by the columnar spacers in the vicinity of the inlet becomes greater than that in the other locations. Accordingly, even though a considerably great pressure is applied in bonding the pair of the substrates to each other, the columnar spacers more densely disposed can sufficiently resist the pressure in the vicinity of the inlet.

In this connection, it is extremely difficult to scatter the approximately spherical spacers. More specifically, in order to prevent the cell gap from narrowing in the vicinity of the inlet in the form of scattering the approximately spherical spacers between a pair of substrates, the spacers need to be scattered densely in the vicinity of the inlet. However, this is extremely difficult. In view of these circumstances, the invention provides the advantage of using the columnar spacers.

Therefore, according to the invention, the clearance between a pair of substrates in the vicinity of the inlet, that is, the cell gap, can be kept at a predetermined thickness, and furthermore the cell gap can be kept at a predetermined thickness throughout the substrate surfaces. In addition, according to the electro-optic device of the invention, the possibility of adversely affecting the display characteristics, such as the light transmittance, the contrast ratio and the response speed due to the unevenness of the cell gap, can be reduced. Furthermore, the possibility of generating the display unevenness can also be decreased. Thus, the image quality can be enhanced.

Moreover, 'the vicinity' described above is the area extending over the proper range cantering the inlet. More specifically, 'the vicinity' is determined specifically in consideration that the area where the columnar spacers have to be disposed densely should be an area so as not to generate defects in images, such as display unevenness.

For example, more generally, it is sometimes observed that the display unevenness can be measured in the order of millimeter to about one centimeter. Thus, the area where the columnar spacers have to be disposed densely is determined in consideration of such circumstances. Besides, more specifically, when the image display space is two inches, a display unevenness of about five millimeters is sometimes observed. Therefore, the area in which the columnar spacers have to be disposed densely is determined as an area of about three to seven millimeters centering five millimeters for example.

In short, 'the vicinity' as described above can be determined properly by experiences, experiments, theories or simulations also including the above description.

In one embodiment of the first electro-optic device of the invention, the columnar spacers disposed in the vicinity of the inlet are disposed more densely inside a semicircular area centering the inlet within the surfaces.

According to the embodiment, the effects and advantages of the invention can be received more effectively. This is because the area where the cell gap becomes smaller generally has extended over in an approximately semicircular shape centering the inlet in the case that the cell gap in the vicinity of the inlet becomes smaller than that in the other parts, which is a problem. In other words, the portion where the inlet itself is disposed is most greatly crushed to decrease the cell gap most and the cell gap becomes gradually greater in a radial pattern starting there, or that crush occurs such that the diameter of the inlet falls into the diameter of the approximately semicircular shape or a part thereof.

However, in the exemplary embodiment of the invention, the columnar spacers are disposed more densely inside the semicircular area centering the inlet within the surfaces, and thus the distinctive unevenness of the cell gap can be eliminated more effectively. In addition, the number of the columnar spacers that have to be disposed densely can be reduced or suppressed to a minimum.

Furthermore the semicircular shape in the exemplary embodiment does not only cover a shape resulting from a perfect circle being divided along its diameter. The invention also covers various irregular shapes, such as a semielliptic shape, for example.

In short, in consideration that the specific arrangement of the columnar spacers in the vicinity of the inlet is determined from the viewpoints of how the display unevenness is reduced or prevented from being generated as described above, it should be noted that 'the semicircular shape' also has to be practically considered from such a viewpoint.

In another embodiment of the first electro-optic device according to the present invention, pixel electrodes arranged in a matrix shape and switching elements connected to each of the pixel electrodes are provided over a first substrate, which is one of the pair of the substrates, and the columnar spacers disposed in the vicinity of the inlet are arranged corresponding to each of the pixel electrodes.

According to the embodiment, a predetermined electric field can be applied to each of the pixel electrodes through the switching elements, such as a thin film transistor (hereafter "TFT") or a thin film diode (hereafter "TFD"), thus allowing the so-called active matrix drive. In addition, a single pixel can be defined as that including at least one of the pixel electrodes and one of the switching elements is formed into one unit.

And particularly in the embodiment, the columnar spacers arranged in the vicinity of the inlet are disposed so as to correspond to each of the pixel electrodes, that is, correspond to each of the pixels. In consideration that one columnar spacer is generally disposed for a few to a few tens of pixels, it is assumed that the columnar spacers are so disposed in portions beyond the vicinity of the inlet even in the embodiment. Then, it can be said that the columnar spacers are disposed more densely in the vicinity of the inlet in the embodiment.

In this connection, the reason why one columnar spacer is disposed from a few to a few tens of pixels is for the purpose of smoothly implementing the introduction of an electro-optic material, such as liquid crystals, through the inlet. When the columnar spacers are disposed for each one of the pixels throughout the substrate surface, it becomes difficult to spread the liquid crystals to the corners of the substrates.

Moreover, to dispose the columnar spacers for each one of the pixel electrodes of course includes the case that two or more columnar spacers are disposed for one pixel electrode, depending on the circumstances, in addition to the case that one columnar spacer is disposed for one pixel electrode.

In still another embodiment of the first electro-optic device of the invention, a shading layer in the matrix shape is disposed over at least one of the first substrate and a second substrate, which is the other of the pair of the substrates, and the columnar spacers are disposed inside the width of the shading layer.

According to the embodiment, the shading layer in the matrix shape, that is, the shading layer formed in a grid shape or in a striped shape is provided, so as not to cause the reduction in the contrast ratio due to the mixed lights between the pixels. In addition, when the related art color filter is disposed, it can reduce or prevent color mixture as well.

Particularly in the embodiment, the columnar spacers are disposed inside the width of the shading layer. More specifically, the columnar spacers are disposed in the portion not directly relating to the image display. Thus, the brightness of images is not impaired, even though the columnar spacers are disposed.

Yet another embodiment of the first electro-optic device of the invention further includes an alignment layer formed on the surfaces of the pair of the substrates facing the electro-optic material, and the columnar spacer is disposed at a corner part in a crossing part inside the shading area in the matrix.

According to the embodiment, the columnar spacer is disposed near the corner part of the pixel electrode. The relationship between this and the alignment layer provided in the embodiment specifically provides at least the following effects and advantages.

More specifically, according to the embodiment, the rubbing process that is required for the alignment layer can be preferably performed. Here, the rubbing process is performed such that, after annealing, the surface of the alignment layer is rubbed with a buffing cloth wrapped around a rotating metal roller in a fixed direction. Accordingly, the alignment orientation of liquid crystals as one example of the electro-optic material can be aligned in a predetermined direction. This is because the polymer main chain of a polyimide forming the alignment layer is stretched in the rubbing direction and the liquid crystal distribution is aligned along the stretched direction.

In the meantime, the rubbing process is preferably performed uniformly throughout the surface of the alignment layer as much as possible. However, various components, such as electrodes, wiring lines and elements, are usually formed over each of the pair of the substrates, and the columnar spacers as well are particularly disposed in the invention. Therefore, it is difficult to uniformly perform the rubbing process throughout the surface of the alignment layer. This is because the various components and the columnar spacers have a vertical dimension (hereinafter "heights"), thus can generate bumps and dips corresponding to the heights on the surface of the alignment layer after annealing. More specifically, even though the bumps and dips are rubbed by the rotating roller, for example, the dips cannot be rubbed sufficiently. Accordingly, the image quality is likely to be considerably adversely affected in this case.

In the embodiment, however, the columnar spacer is disposed at the corner part in the crossing part, whereby the above problem can be reduced or eliminated to a considerable extent.

More specifically, according to the arrangement of the columnar spacers in the embodiment, the peripheral part is not disposed with the columnar spacers being a nearly planar surface at other than the central part in the crossing part and the corner part in the crossing part. In such a case, the direction of the rubbing process is set in the direction from the corner part to the central part of the crossing part. Accordingly, the portions disposed behind the columnar spacers due to the 'height' thereof, that is, the portions that are hard to subject to the rubbing process, are to be contained in the crossing part.

In the meantime, the crossing part is originally the crossing part in the shading area corresponding to the clearance between the pixel electrodes arranged in a matrix shape, and the shading layer is generally disposed in the shading area as described above. In consideration of this, it is understood that containing the portions that are not sufficiently subjected the rubbing process in the crossing part is preferable to enhance the image quality. More specifically, even though there are portions that are not sufficiently subjected to the rubbing process in the shading area, the image quality is not affected greatly. In other words, when the columnar spacers are disposed, the portions that are not sufficiently subjected to the rubbing process are generated more or less. However, according to the embodiment, a preferable rubbing process can be implemented in the sense that those portions can be contained in the portions not affecting the image display.

In addition, structure can be described wherein the crossing part is a square and the columnar spacer is disposed at the upper left corner part, which is one of the corner parts. In this case, the central part of the square and the peripheral part including the upper right corner part, the under left corner part and the under right corner part in the square have a nearly planar surface. Therefore, it is acceptable if the direction of the rubbing process in this case is in the direction from the upper left corner part to the central part or to the under right corner part with regard to the square.

Particularly, the embodiment further includes an alignment layer with a rubbing process over one of the pair of the substrates where the columnar spacers are disposed, and it is acceptable to locate the corner part at a corner on the upstream side in the rubbing direction in the crossing part over the substrate where the columnar spacers are disposed. Effects and advantages are apparent from the description above.

In still yet another embodiment of the first electro-optic device of the invention, a plurality of the inlets is provided, and the columnar spacers are disposed more densely for each of the plurality of the inlets within the surfaces.

According to the embodiment, even though the pair of the substrates has a relatively large area or diameter, for example, the cell gap between the pair of the substrates can be preferably kept at a predetermined value.

In this connection, when the substrates have a relatively large diameter, a plurality of the inlets can be disposed in order to efficiently introduce liquid crystals into the clearance between the pair of the substrates as the embodiment. In the embodiment having the plurality of the inlets in this manner, the problem of the cell gap becomes more critical due to the existence of the inlets. However, the embodiment can be preferably adapted to such a case.

Furthermore, in the above description, the large diameter is specifically where the size of the image display space in the electro-optic device is about 15 inches or greater.

A second electro-optic device of the invention has a pair of substrates formed to sandwich an electro-optic material; an inlet to communicate a clearance sandwiched between the pair of the substrates with the outside thereof; and a plurality of columnar spacers disposed as scattered within the surfaces of the pair of the substrates facing each other, the columnar spacers being disposed within the surfaces. Pixel electrodes arranged in a matrix shape are disposed over the substrate. The columnar spacers in the vicinity of the inlet are disposed corresponding to each of the pixel electrodes. The columnar spacers in other locations are disposed as one spacer for 2 to 30 of the pixel electrodes.

According to the second electro-optic device of the invention, the columnar spacers enable the space between the pair of the substrates to be maintained at a predetermined thickness, and introduce the electro-optic material, such as liquid crystals, between the pair of the substrates through the inlet, similarly to the first electro-optic device.

In addition to this, particularly in the invention, the columnar spacers in the vicinity of the inlet are disposed corresponding to each of the pixel electrodes, and the columnar spacers in other locations are disposed as one spacer for 2 to 30 of the pixel electrodes. More specifically, the arrangement density of the columnar spacers in the vicinity of the inlet is set to be greater than that in the other locations.

Therefore, the reaction caused by the columnar spacers in the vicinity of the inlet becomes greater than that in the other locations. Accordingly, even though a considerably great pressure is applied in bonding the pair of the substrates, the columnar spacers disposed more densely sufficiently resist the pressure in the vicinity of the inlet.

In addition to this, in the second electro-optic device, the arrangement density of the columnar spacers in the vicinity of the inlet is one [spacer/pixel], whereas the arrangement density in the other places is about 0.03 to 0.5 [spacer/pixel]. The former is about 2 to 33 times the latter. Therefore, the possible reaction exerted by the entire columnar spacers in the vicinity of the inlet can be considerably greater than that in the other locations, and the effects and advantages are to be exerted significantly effectively.

Therefore, according to the invention, the clearance between the pair of substrates in the vicinity of the inlet, that is, the cell gap can be kept at a predetermined thickness, and the cell gap can be kept at a predetermined thickness throughout the substrate surfaces. Furthermore, consequently, according to the electro-optic device in the invention, the possibility of adversely affecting the display characteristics, such as light transmittance, contrast ratio and response speed due to the unevenness of the cell gap, can be reduced, and the possibility of generating display unevenness can be decreased. Thus, image quality can be enhanced.

Moreover, the meaning of 'the vicinity' in the invention is the same as the description regarding the first electro-optic device.

Also in the second electro-optic device of the invention, the various embodiments described with regard to the first electro-optic device can be applied as a matter of course. More specifically, the embodiments can be adapted to the second electro-optic device such that the columnar spacers are disposed more densely inside 'the semicircular shape', they are disposed inside 'the width of the shading layer', they are disposed at 'the corner part in the crossing area in the shading area', they are disposed at 'the corner on the upstream side in the rubbing direction', and 'a plurality of the inlets' are provided.

In another embodiment of the first or second electro-optic device of the invention, the arrangement density of the columnar spacers gradually reduces from the center of the inlet toward the outside of the center as the substrate is viewed in plan view.

According to the embodiment, the arrangement density of the columnar spacers in the immediate center of the inlet can be set P [spacer/pixel], for example, and the arrangement density of the columnar spacers in the locations considerably separate from the inlet other than in the vicinity of the inlet can be set Q [spacer/pixel]. The area generally exists that the columnar spacers are disposed at an arrangement density of X [spacer/pixel] where P>Q and P>X>Q are satisfied. Further generalizing this, it can be thought that the area has arrangement densities of X1, X2, . . . Xn [spacer/pixel], where P >X1>X2>. . . >Xn>Q is satisfied.

In addition, more specifically, the area where the columnar spacers are disposed densely is a semicircular shape can have the radius R [mm]. The embodiment is included within the scope of the embodiment that the arrangement density is P in the semicircular area of the radius r [mm] from the center of the semicircular shape, the arrangement density is Xr–R in the area between the outer radius of the semicircular shape having the radius r and the inner radius of the semicircular shape having the radius R, and the arrangement density is Q in the area other than the semicircular area of the radius R, where P>$X_r$–R>Q.

According to the embodiment, the columnar spacers are disposed most densely in the central portion of the inlet, which can be considered most crushable in bonding the pair of the substrates, and the columnar spacers are gradually disposed more sparsely in accordance with the likeliness to be less crushable as separate from the central portion. Therefore, the embodiment can implement the more effective, proper arrangement form of the columnar spacers to keep the cell gap constant.

An electronic device of the invention is formed to have the electro-optic device of the invention described above in order to address or solve the above and/or other problems (however, including the various embodiments).

According to the electronic device of the invention, it is formed to have the electro-optic device of the invention including the various embodiments. Thus, the cell gap between the pair of the substrates forming the electro-optic device is kept constant, whereby various electronic devices can be realized, such as a projection display device (liquid crystal projector), a liquid crystal television, a cellular phone, a personal digital assistant, a word processor, a viewfinder or monitor direct view video tape recorder, a work station, a visual telephone, a point-of-sale terminal, and a touch panel, which can display high-quality images, for example.

Exemplary effects and advantages of the invention will be apparent from the following embodiments.

DETAILED DESCRIPTION OF PREFERRED EMBODIMENTS

Hereafter, exemplary embodiments of the invention will be described with reference to the drawings. In the following exemplary embodiments, the electro-optic device of the invention is adapted to a liquid crystal display device.

Overall Configuration of the Electro-optic Device

Figure 1:
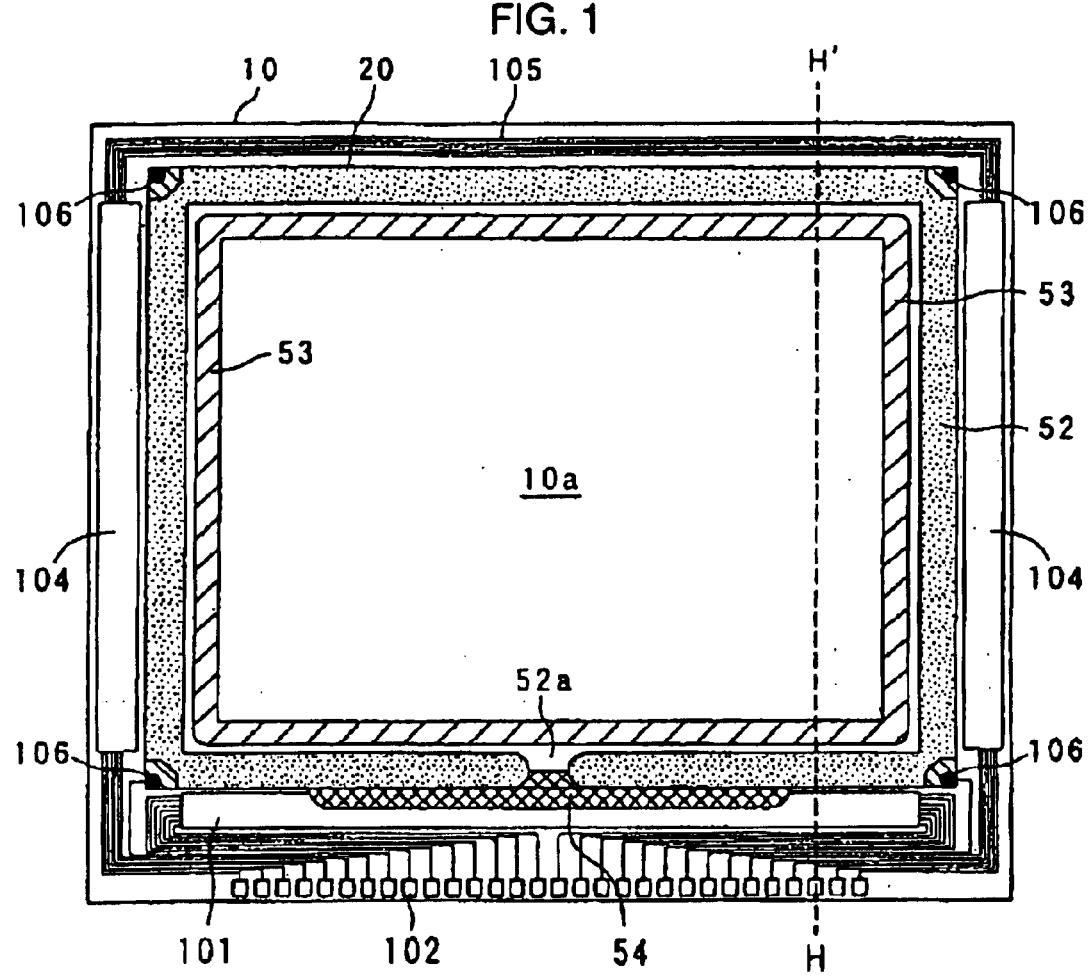
FIG. 1 is a plan view of a TFT array substrate in an electro-optic device of an exemplary embodiment of the invention, as viewed from the opposite substrate along with various components thereon.
Figure 2:
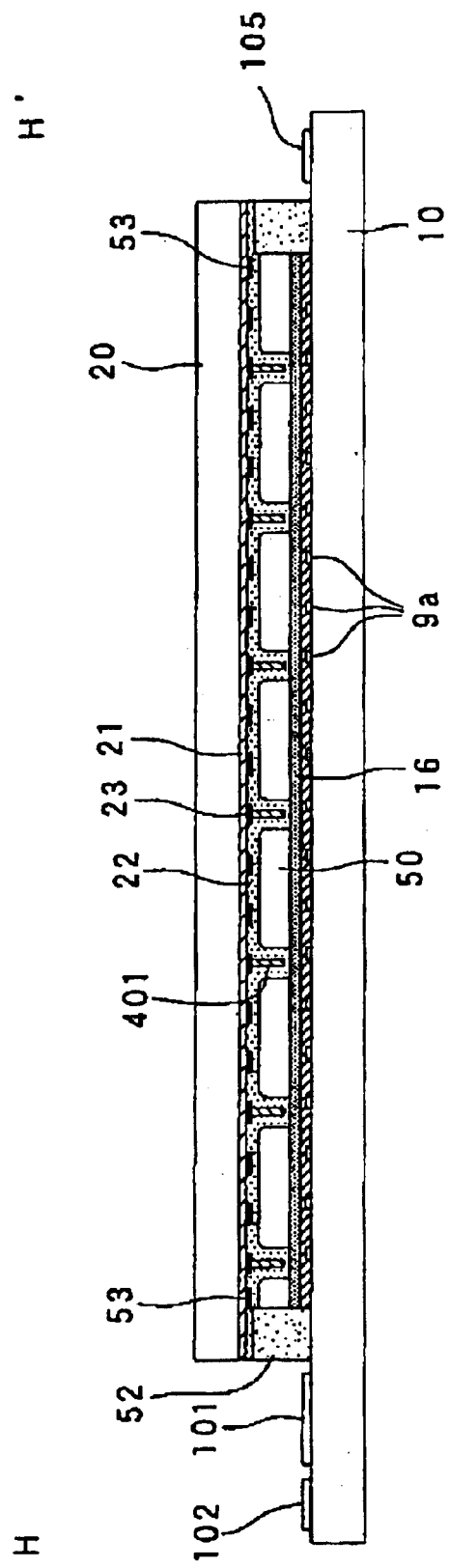
FIG. 2 is a cross-sectional view taken along plane H—H' shown in FIG. 1.

First, the overall configuration of the electro-optic device of an exemplary embodiment will be described with reference to FIGS. 1 and 2. FIG. 1 is a plan view showing a TFT array substrate from an opposite substrate 20 along with various components formed thereon. FIG. 2 is a cross-sectional view taken along plane H—H' of FIG. 1.

In FIGS. 1 and 2, the electro-optic device in the embodiment has the TFT array substrate 10 faced to an opposite substrate 20. A liquid crystal layer 50 is sealed between the TFT array substrate 10 and the opposite substrate 20. The TFT array substrate 10 is bonded to the opposite substrate 20 with a sealing material 52 disposed in a sealing area around an image display area 10a.

The liquid crystal layer 50 is made of liquid crystals mixed with, for example, one kind or several kinds of Twisted Nematic liquid crystals, which has a predetermined alignment state between a pair of alignment layers described below.

In addition, the image display space 10a is the area where pixel electrodes 9a, TFTs connected to the pixel electrodes 9a, scanning lines and data lines are disposed over the TFT array substrate 10, or the area facing thereto where the counter electrode 21 is disposed throughout the opposite substrate 20. It is the area that contributes to image display by allowing light transmission from the near side to the far side on the paper of FIG. 1 (that is, from the opposite substrate 20 to the TFT array substrate 10). Furthermore, the reason why the light transmission is allowed is that the pixel electrodes 9a or a part thereof, or the counter electrode 21 are made of transparent materials and an electric field is applied to the pixel electrodes 9a to alter the state of the liquid crystal layer 50. Moreover, one pixel is defined in which one of the pixel electrodes 9a and one of the TFTs are formed into one unit. In this embodiment, the 'pixel' and 'the pixel electrode' can be used as the terms having almost the same meaning.

As shown in FIG. 1, the sealing material 52 is disposed in a 'picture frame' shape in plan view as surrounding the periphery of the image display space 10a. As shown in the lower part in FIG. 1, a notch is formed in a part thereof to dispose a liquid crystal inlet 52a. The existence of the liquid crystal inlet 52a is to communicate the clearance sandwiched between the TFT array substrate 10 and the opposite substrate 20 with the exterior. Utilizing this allows injecting liquid crystals to the clearance in the fabrication process.

In addition, the specific size of the liquid crystal inlet 52a can be often formed in the order of millimeter, depending on the size of the substrates 10 and 20. More specifically, it is acceptable to be about three millimeters. Furthermore, in the completed electro-optic device, in order not to leak the liquid crystals introduced into the clearance, a sealing medium 54 made of an ultraviolet cured acrylic resin, for example, is disposed as matched with the portion where the liquid crystal inlet 52a exists.

As the materials configuring such the sealing material 52, an ultraviolet cured resin and a thermoset resin, for example, can be used. In bonding the TFT array substrate 10 to the opposite substrate 20, a proper pressure is applied to press and bond both the substrates 10 and 20, and ultraviolet rays are irradiated onto the sealing material when the sealing material is made of the ultraviolet cured resin, or it is heated when it is made of the thermoset resin, so as to be cured.

Moreover, gap materials (not shown in the drawing), which are one kind of spacers, are mixed in the sealing material 52 in order to allow the interval of the clearance sandwiched between the substrates 10 and 20, that is, the cell gap, to have a predetermined value. The gap materials are made of glass fiber or glass beads, for example, generally utilizing those having an approximately spherical shape.

Then, particularly in the embodiment, in order to keep the cell gap between the TFT array substrate 10 and the opposite substrate 20 at a predetermined value, columnar spacers 401 are disposed over the counter electrode 21 on the opposite substrate 20 other than the gap materials as shown in FIG. 2. The columnar spacers 401 are made of materials, such as an acrylic resin and a polyimide, and each one of them has an approximately square pole or approximately cylindrical shape, as shown in FIG. 2. In addition, the shape can be formed by techniques in which a film made of the material is deposited over at least one of the TFT array substrate 10 and the opposite substrate 20 and then the film is etched with the application of the photolithography techniques for shaping or patterning. In this case, it is possible not only to form the shape of the columnar spacers 401 into the shapes described above, but also to define the arrangement freely, depending on the exposure process (patterning process) to the resist film formed on the film.

Figure 3:
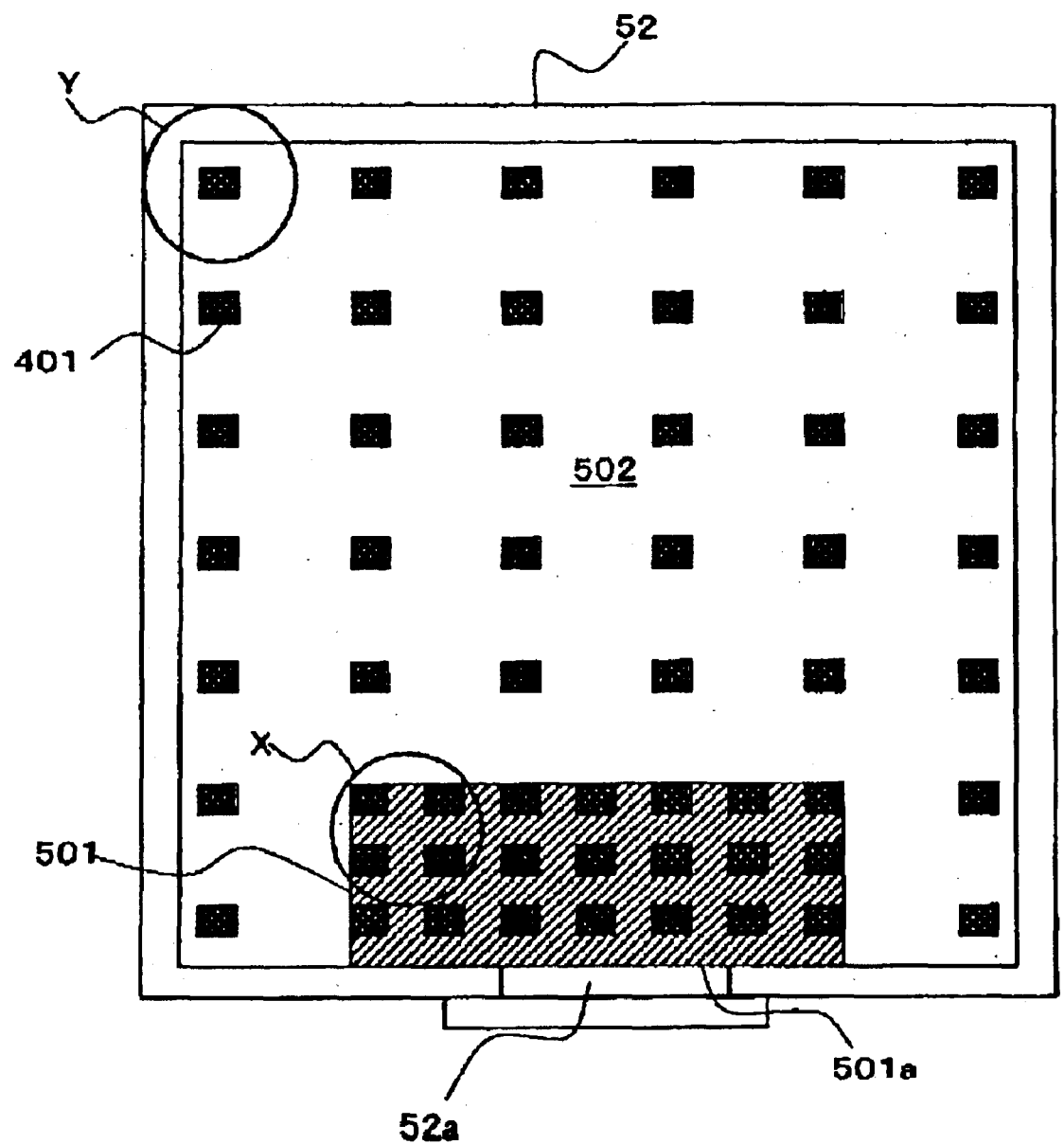
FIG. 3 is a schematic illustrating an exemplary arrangement of the columnar spacers in the embodiment of the invention.

Then, as ideally shown in FIG. 3, the columnar spacers 401 are formed and disposed more densely in the vicinity of the liquid crystal inlet 52a and more sparsely in the portions other than that. More specifically, in the embodiment, the columnar spacers 401 are disposed such that they are disposed more densely in an approximately quadrate area (hereafter "quadrate area") 501 than in the other area 502, the area 501 includes a line 501a containing the portion having the liquid crystal inlet 52a as one side. Furthermore, it should be noted that the density and sparseness are expressed consistently ideally in FIG. 3.

Figure 4:
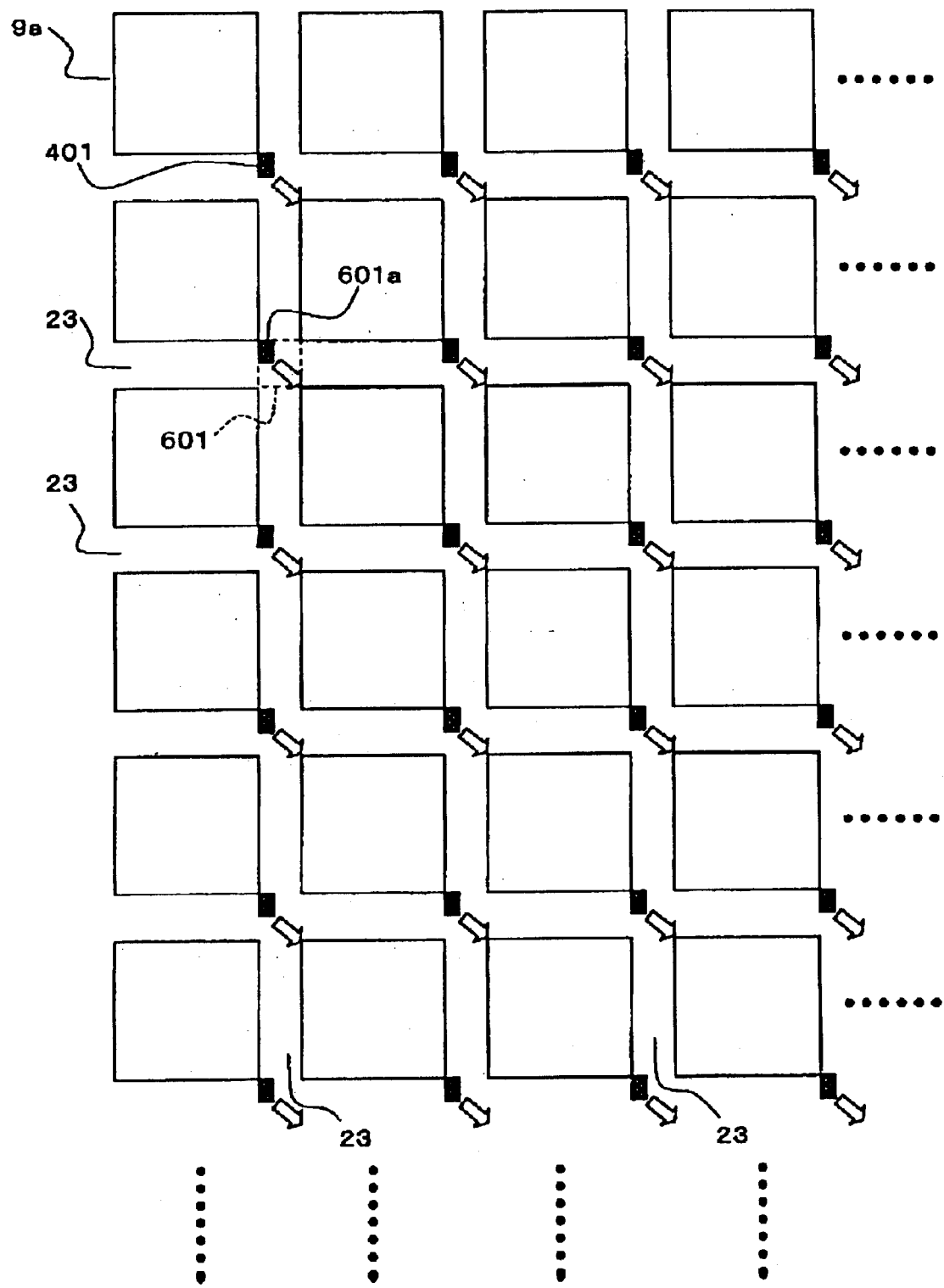
FIG. 4 is a schematic illustrating an exemplary arrangement of the columnar spacers in the area of the vicinity of the liquid crystal inlet.
Figure 5:
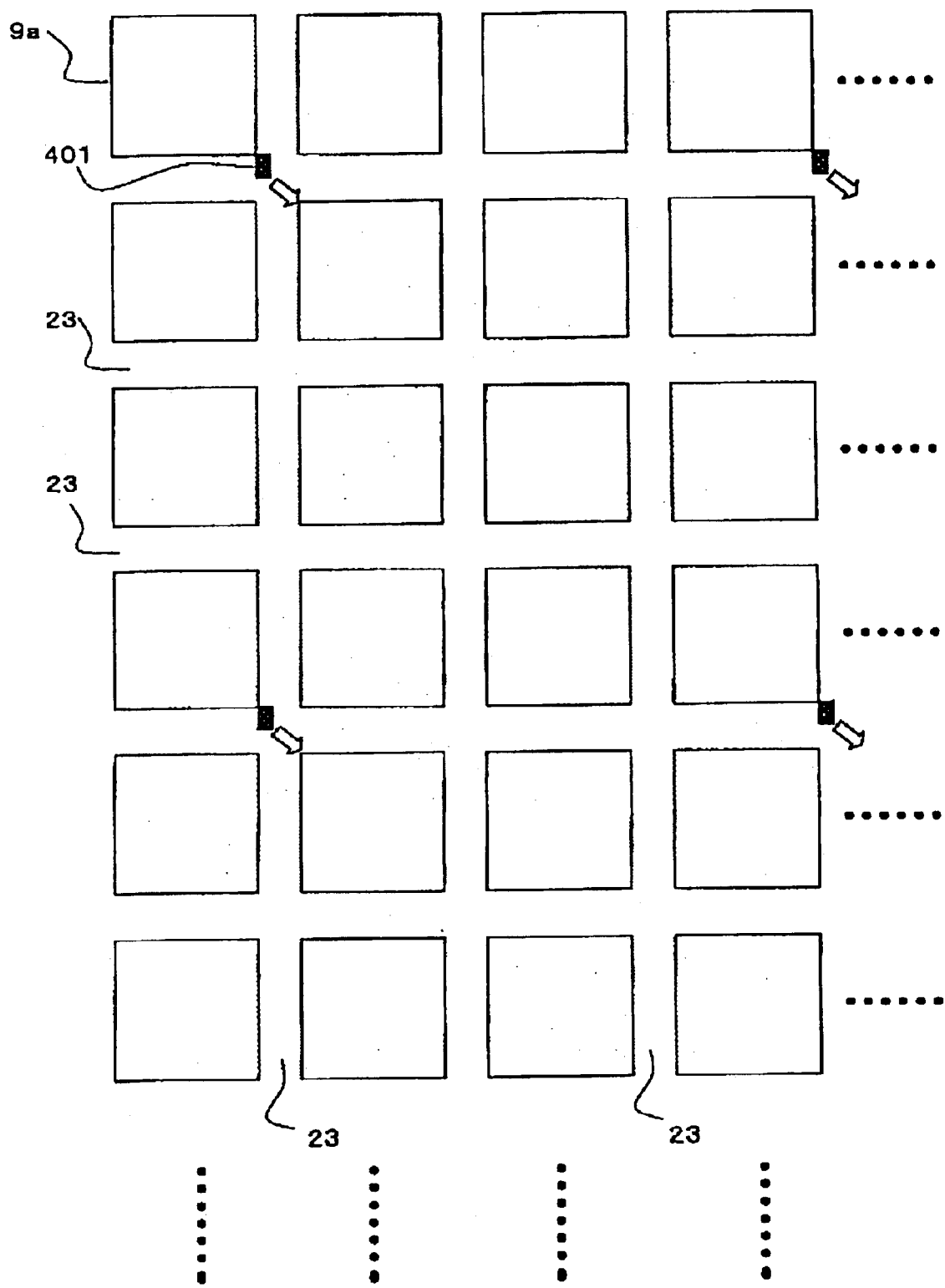
FIG. 5 is a schematic illustrating an exemplary arrangement of the columnar spacers in the area other than the vicinity of the liquid crystal inlet.

FIGS. 4 and 5 illustrate the inside of the enlarged circles denoted by X and Y in FIG. 3. The arrangement of the columnar spacers 401 is illustrated in more detail and more practically. More specifically, in FIG. 4, each of a plurality of the columnar spacers 401 is disposed corresponding to each one of the pixel electrodes 9a, whereas in FIG. 5, one columnar spacer 401 is disposed at every three pixel electrodes 9a spacing two pixel electrodes 9a in the longitudinal and transverse directions in the drawing. Using the unit of density, it can be said that the former is that the columnar spacer 401 is disposed at one [spacer/pixel], whereas the latter is that it is disposed at about 0.1 [spacer/pixel] (=1÷9).

In the meantime, the columnar spacers 401 are disposed in a grid-shaped shading area that is defined as winding the space between the pixel electrodes 9a in both drawings. Then, the grid-shaped shading area has a shading layer 23 of the grid shape nearly matched with the area (see also FIG. 2) and a frame shading layer 53 defining the outermost periphery of the grid-shaped shading area (see also FIG. 1).

Shortly, the columnar spacers 401 in the embodiment are disposed inside the width of the grid-shaped shading layer 23.

In this connection, the shading layer 23 can reduce or prevent light mixing between the pixel electrodes 9a, not causing the reduction in the contrast. In addition, as the materials configuring the shading layer 23, resin black of chromium metal, carbon or titanium scattered in a photoresist, or metal materials such as nickel can be considered. Furthermore, those having a laminated structure of two or more materials including these are possible.

Moreover, the columnar spacers 401 in the embodiment are disposed within the range of the width of the grid-shaped shading layer 23, and more specifically, they are disposed in the vicinity of the corner part of the pixel electrode 9a, as shown in FIGS. 4 and 5. In other words, the columnar spacer 401 is disposed at an upper left corner part 601a in a crossing part 601 in the grid-shaped shading area arranged in a matrix shape in the drawing.

In addition to the configuration, in FIGS. 1 and 2, a data line drive circuit 101 for feeding image signals to data lines, described below, at predetermined timing to drive the data lines, and external circuit connecting terminals 102 are disposed in the area outside the sealing material 52 along one side of the TFT array substrate 10, whereas scanning line drive circuits 104 for feeding scan signals to scanning lines, described below, at predetermined timing to drive the scanning lines are disposed along two sides adjacent to the side.

Furthermore, the scanning line drive circuit 104 may be disposed on one side when the delay of the scan signal fed to the scanning lines does not cause a problem. Moreover, the data line drive circuit 101 may be disposed on both sides along the image display space 10a.

On the remaining one side of the TFT array substrate 10, a plurality of wiring lines 105 to connect the scanning line drive circuits 104 disposed on both sides of the image display space 10a is disposed. In at least one place of the corner parts of the opposite substrate 20, a conductive material 106 to electrically conduct the TFT array substrate 10 to the opposite substrate 20 is disposed.

In addition, in FIG. 2, over the TFT array substrate 10, an alignment layer 16 is formed on the pixel electrodes 9a after forming pixel switching TFTs, and wiring lines, such as the scanning lines and the data lines. Furthermore, over the opposite substrate 20, an alignment layer 22 is formed in the uppermost layer in addition to the counter electrode 21 made of a transparent material such as ITO (indium-tin oxide). The alignment layer 22 in the embodiment is formed as covering the counter electrode 21 in relation of the columnar spacers 401 disposed on the opposite substrate 20, and it is formed as also covering the columnar spacers 401.

Moreover, over the TFT array substrate 10, a sampling circuit to apply image signals to a plurality of data lines 6a at predetermined timing, a precharge circuit to feed precharge signals at a predetermined voltage level to the plurality of the data lines 6a prior to the image signals, and a testing circuit to inspect the quality and defects of the electro-optic devices in the course of fabrication or shipping may be formed, in addition to the data line drive circuit 101 and the scanning line drive circuits 104.

In the electro-optic device of the embodiment having such a configuration the distinctive arrangement form of the columnar spacers 401 in particular provide the following exemplary effects and advantages.

More specifically, first, the columnar spacers 401 are disposed more densely in the quadrate area 501 in the vicinity of the liquid crystal inlet 52a. Thus, in the process of fabricating the electro-optic device in the embodiment, particularly in the panel alignment process of bonding the TFT array substrate 10 to the opposite substrate 20, the problem can be eliminated or substantially eliminated that the cell gap in the vicinity of the liquid crystal inlet 52a becomes smaller than that in the other portions. This is because the columnar spacers 401 are disposed more densely in the quadrate area 501, and thus the reaction caused by the columnar spacers 401 becomes greater than the reaction caused by the columnar spacers 401 in the other portions. Therefore, even though a considerably great pressure is applied in bonding the TFT array substrate 10 to the opposite substrate 20, the columnar spacers 401 disposed more densely resist the pressure sufficiently in the vicinity of the liquid crystal inlet 52a.

Accordingly, the cell gap in the vicinity of the liquid crystal inlet 52a can be maintained nearly equal to that in the other portions, and the cell gap can be kept at a predetermined value throughout the surfaces of the substrates 10 and 20. Then, consequently, according to the electro-optic device in the embodiment, the possibility to adversely affect the display characteristics, such as light transmittance, contrast ratio and response speed, can be reduced, and the possibility of generating the display unevenness can be decreased as well. Thus, image quality can be enhanced.

In addition to the description above, according to the embodiment, the columnar spacer 401 can be formed within the range of the width of the shading layer 23 and disposed at the upper left corner part 601a of the crossing part 601, as described with reference to FIGS. 4 and 5. Therefore, the columnar spacers 401 do not become obstacles on the image display, and the alignment layer 22 preferably can undergo the rubbing process. Here, preferably undergoing the rubbing process means that the portions that do not undergo the rubbing process well can be contained inside the crossing parts 601.

For example, in FIGS. 4 and 5, when the rubbing process is performed in the direction indicated by the arrows shown in the drawings, the portions that do not undergo the rubbing process will be contained inside the crossing parts 601. The crossing parts 601 are a part of the area to form the grid-shaped shading layer 23. Thus, even though a minor defect is in the laminated structure sandwiching the crossing parts 601, it does not have a great influence upon the image display. Accordingly, even though the defects to the alignment layer 22 in the rubbing process are generated in the crossing parts 601, they will not have a great influence upon the image display. In other words, the provision of the columnar spacers 401 generates the portions that do not undergo the rubbing process well more or less. In the embodiment, however, they can be contained in the portions that do not have influence upon the image display (that is, in the crossing parts 601). In that sense, the preferable rubbing process can be performed.

Furthermore, the area where the columnar spacers 401 have to be disposed more densely was the approximately quadrate area, but the invention is not limited to this structure.

Figure 6:
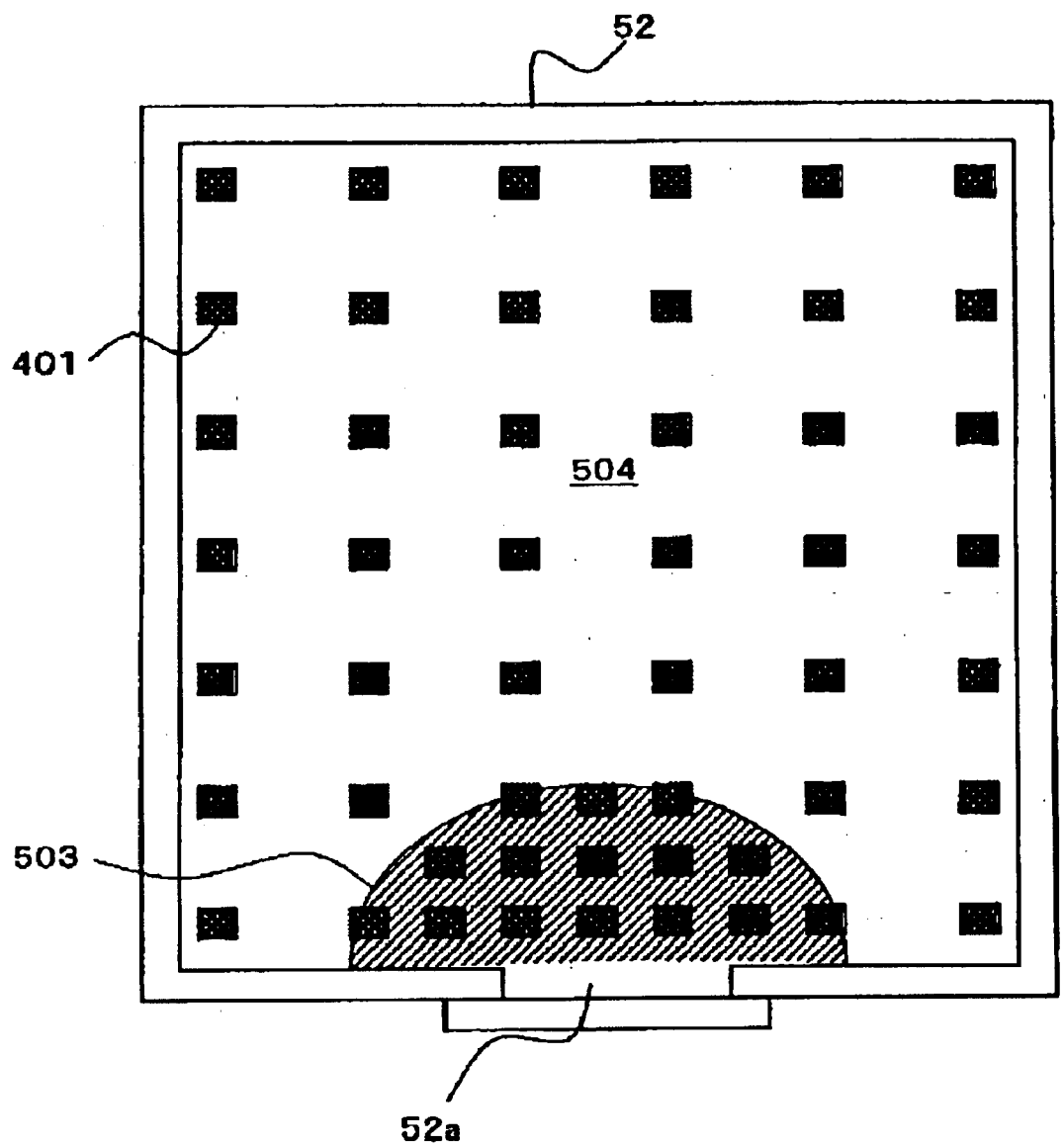
FIG. 6 is a schematic illustrating an exemplary arrangement of the columnar spacers different form those in FIG. 3, which is different in that the area where the columnar spacers are disposed more densely is a semicircular shape.

For example, as ideally shown FIG. 6, it can be considered that an area 503 that is an approximately semielliptic shape centering the liquid crystal inlet 52a (hereafter "semielliptic area") is thought and the columnar spacers 401 are disposed more densely inside thereof and disposed more sparsely in an area 504 other than the semielliptic area 503.

According to such a configuration, the display unevenness on the image can be prevented from being generated more surely. This is because in the case that the cell gap in the vicinity of the liquid crystal inlet 52a becomes smaller than that in the other portions, which can be a problem, the area where the cell gap becomes smaller has generally extended over the approximately semicircular shape centering the liquid crystal inlet 52a.

However, according to the embodiment, the columnar spacers 401 are disposed more densely inside the approximately semicircular area centering the liquid crystal inlet 52a in plan as shown in FIG. 6. Thus, the distinctive unevenness of the cell gap can be eliminated more effectively.

In the invention, the area where the columnar spacer 401 has to be disposed more densely can be set variously other than the quadrate area 501 or the semielliptic area 503.

Figure 7:
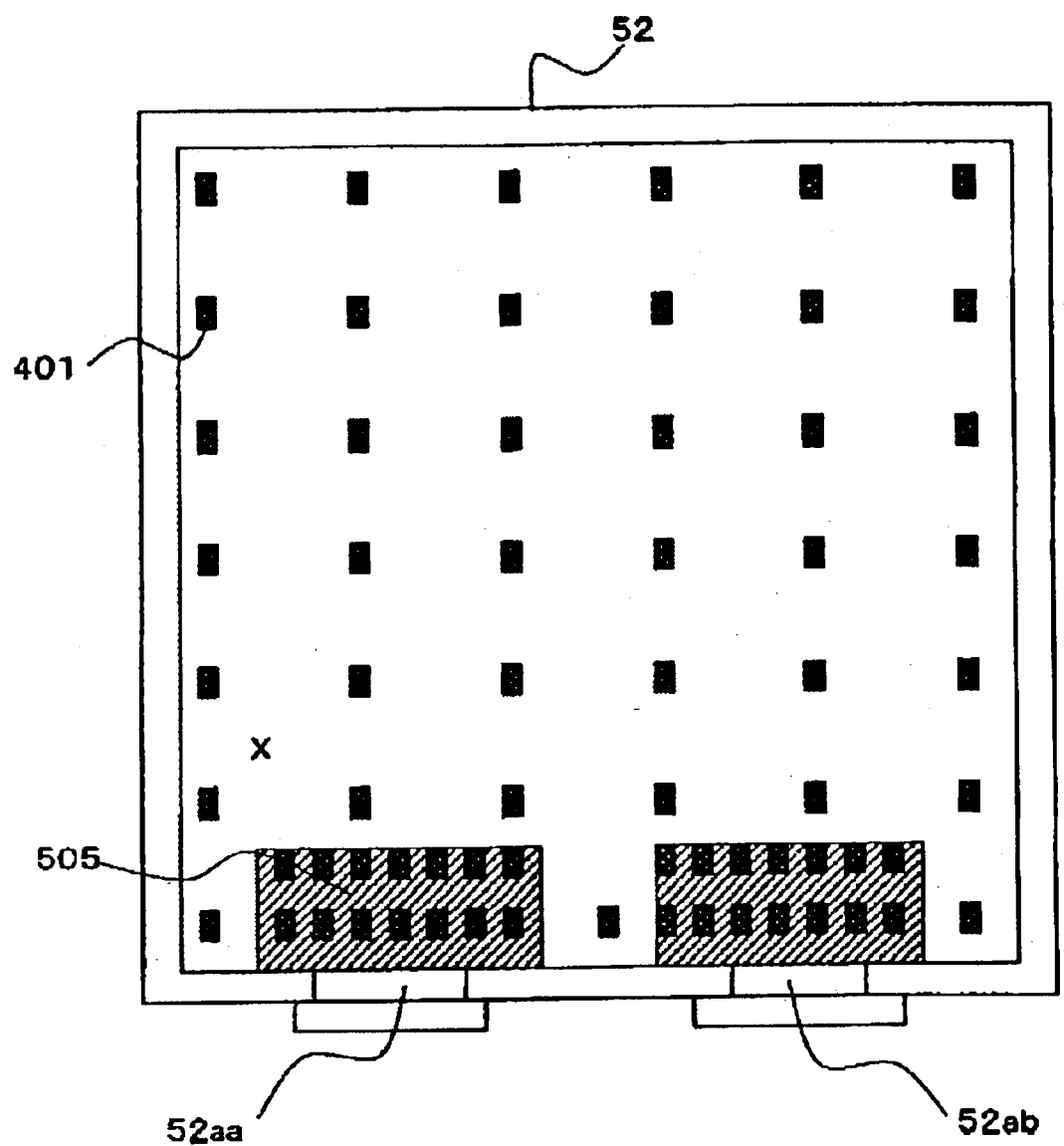
FIG. 7 is a schematic illustrating an exemplary arrangement of the columnar spacers varied from those in FIG. 3, which is different in that the number of the liquid crystal inlets is varied from that in FIG. 3.

In addition, in the description above, the form of providing only one liquid crystal inlet 52a was described, but the invention is not limited to this structure. For example, the invention can be adapted to such the case that two liquid crystal inlets are provided because of a relatively large image display space 10a. For example, as ideally shown in FIG. 7, in the case of providing two inlets such as liquid crystal inlets 52aa and 52ab, the columnar spacers 401 may be arranged as those shown in FIG. 3 or 6 for the two liquid crystal inlets 52aa and 52ab. In this connection, as shown in FIG. 4, the form is illustrated in FIG. 7 that the columnar spacers 401 are disposed densely inside a quadrate area 505.

Furthermore, in the description above, the arrangement densities of the columnar spacers 401 that have to be formed in the quadrate area 501 and the other area 502 (see FIG. 3) were one [spacer/pixel] and about 0.1 [spacer/pixel], respectively. However, the invention is of course not limited to such a structure. In short, exemplifying FIG. 3, suppose the arrangement density of the columnar spacers 401 in the quadrate area 501 in the vicinity of the liquid crystal inlet 52a is set p, and the arrangement density of the columnar spacers 401 in the area 502 other than the vicinity of the liquid crystal inlet 52a is set Q. It is acceptable to satisfy the relationship of P>Q.

However, preferably, it is fine to be configured that the columnar spacers 401 in the vicinity of the liquid crystal inlet 52a are disposed as one spacer for each of the pixel electrodes 9a, whereas the columnar spacers 401 in the other area are disposed as one spacer for 2 to 30 of the pixel electrodes 9a. In this case, the arrangement density of the former is one [spacer/pixel], whereas the arrangement density of the latter is 0.03 to 0.1 [spacer/pixel]. Accordingly, the former is about 2 to 33 times the latter. The possible reaction exerted by the entire columnar spacers 401 in the vicinity of the liquid crystal inlet 52a becomes considerably greater than that in the other area. Thus, effects and advantages are exerted significantly effectively.

In addition to this, in the description above, the columnar spacers 401 are formed as configuring the acrylic resin in a columnar shape over the counter electrode 21 on the opposite substrate 20. However, the invention is not limited to such a structure. For example, various modified forms can be provided, as shown in FIGS. 8A, 8B and 8C.

Figure 8:
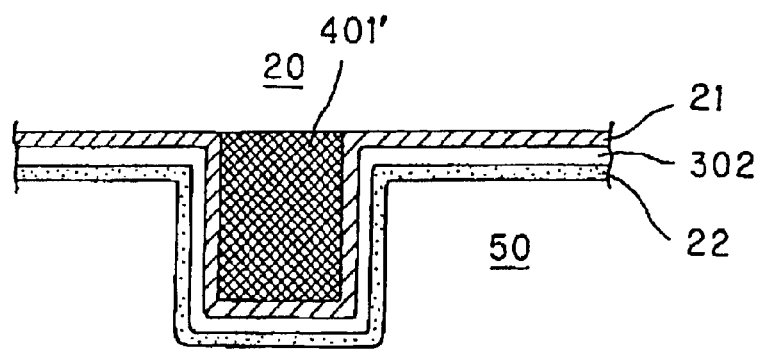
FIGS. 8A, 8B, and 8C are cross-sectional views illustrating various modified exemplary embodiments of the columnar spacers.
Figure 8:
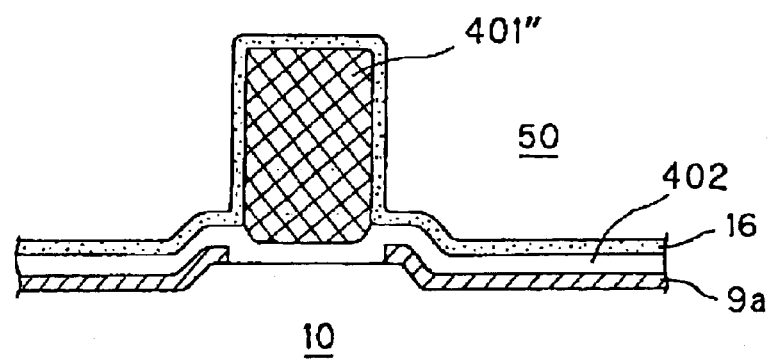
Figure 8:
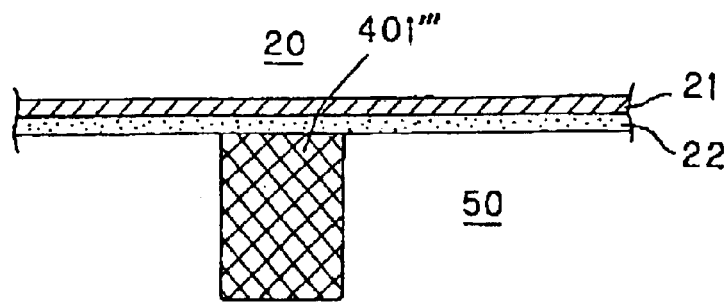

First, as shown in FIG. 8A, a columnar spacer 401' may be formed by patterning the shading layer 23 as an insulating material layer, the shading layer 23 being under the counter electrode 21 (it is on the upper side in the drawing) made of the ITO film on the opposite substrate 20. In this case, it is acceptable to provide a transparent insulating film 302 between the pixel electrode 9a and the counter electrode 21 to prevent a short circuit therebetween (at least on one of the substrates). In addition, as shown in FIG. 8B, a columnar spacer 401" may be disposed on the TFT array substrate. In this case, the columnar spacer 401" is formed on the pixel electrode 9a through a transparent insulating film 402. The rubbing process may be performed to the alignment layer 22 on the opposite substrate 20 not shown in the drawing. Alternatively, as shown in FIG. 8C, the alignment layer 22 is formed on the opposite substrate 20, and then a columnar spacer 401''' may be disposed.

Furthermore, instead of forming the columnar spacer from a proper organic material by patterning, walls may be formed from projecting portions other than grooves by forming the grooves (recessed parts) in the area on the substrate except the area where the columnar spacers have to be formed such that grooves are formed in the substrate main body (the opposite substrate 20 or TFT array substrate 10) or in an interlayer dielectric laminated on the substrate by etching, for example. Moreover, also in this case, it is acceptable to provide a transparent insulating film between the pixel electrode 9a and the counter electrode 21 to prevent a short circuit therebetween, as similar to the modified examples in FIGS. 8A, 8B and 8C.

Modified Embodiment

Figure 9:
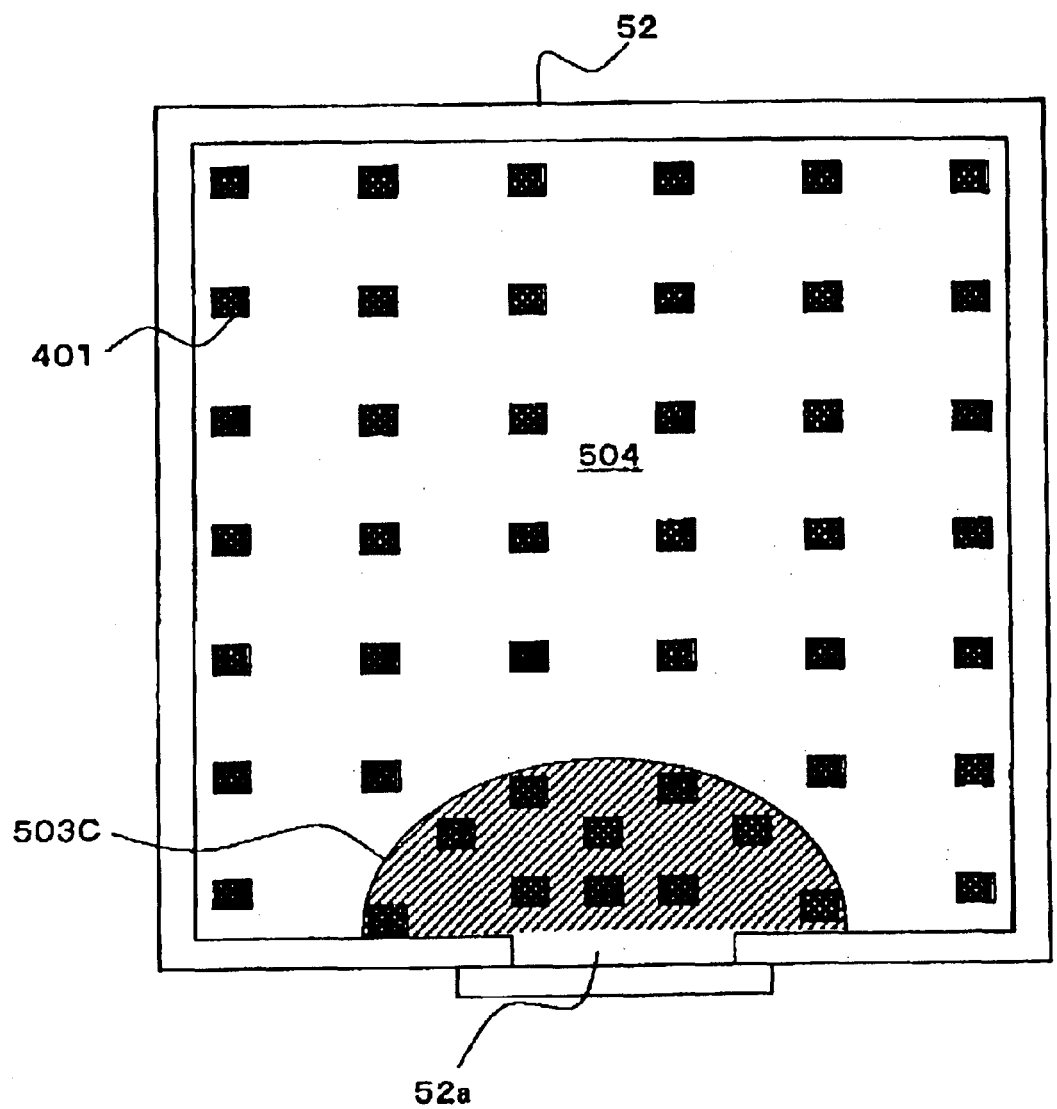
FIG. 9 is a schematic illustrating an exemplary arrangement of the columnar spacers in the modified embodiment of the invention, and shows similar features as FIGS. 3, 6 and 7.
Figure 10:
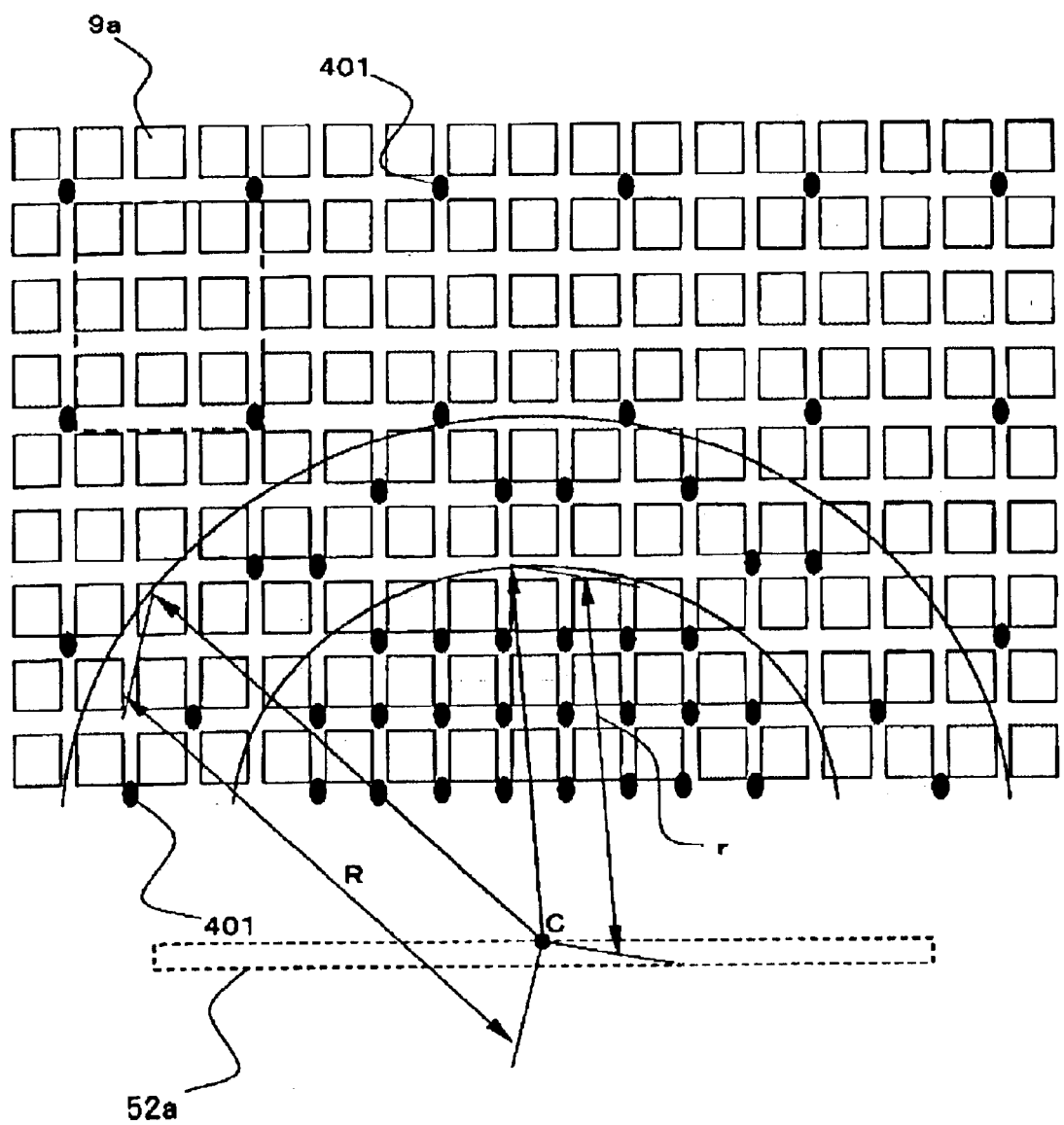
FIG. 10 is a partially enlarged view of the semicircular area and its vicinity in FIG. 9.

Hereafter, a modified embodiment that modifies the electro-optic devices in the above embodiments is described with reference to FIGS. 9 and 10. FIG. 9 has the same intention as that of FIGS. 3, 6 and 7, ideally illustrating the arrangement form of the columnar spacers in the modified embodiment. FIG. 10 is a partial enlarged view of the semicircular area 503C and the vicinity thereof in FIG. 9. In addition, the overall configuration of the electro-optic device in the modified embodiment is almost the same as the embodiments above, thus duplicative descriptions are omitted.

Furthermore, when the drawings referred to below have the same elements as those described in the embodiments above, the same reference numerals and signs used in the embodiments above are used.

First, in FIG. 9, the columnar spacers 401 are disposed more densely inside the semicircular area 503C centering the liquid crystal inlet 52a in plan, as nearly similar to that in FIG. 6. Accordingly, as already described, effects and advantages of reducing or preventing crush can be obtained in accordance with the circumstances that the crush has been generated over the approximately semicircular shape centering the liquid crystal inlet 52a.

Then, particularly in FIG. 9, the columnar spacers 401 are disposed so as to gradually decease the density from the center of the liquid crystal inlet 52a to the outside. In more details, as shown in FIG. 10, the radius of the semicircular area 503C where the columnar spacers 401 are disposed densely is R [mm]. In the semicircular area having a radius of r [mm] from the center C of the semielliptic area 503, the arrangement density P is one [spacer/pixel]. In the area between the outer radius of the semicircular shape of the radius r and the inner radius of the semicircular shape of the radius R, the arrangement density Xr–R is about 0.3 to 0.4 [spacer/pixel]. In the area other than the semicircular area of the radius R (that is, the semicircular area 503C), the arrangement density Q is about 0.1 [spacer/pixel]. Therefore, P>Xr–R>Q. The specific value of Xr–R here is based on that there are 12 columnar spacers 401 and about 34 pixel electrodes 9a in the area shown in FIG. 10. The specific value of Q is based on that the area shown in FIG. 10 has the similar arrangement form as that shown in FIG. 5(see broken lines in FIG. 10).

According to such the embodiment, the columnar spacers 401 are disposed most densely in the center C and the vicinity of the liquid crystal inlet 52a where the spacers are considered to be most crushable in bonding the TFT array substrate 10 to the opposite substrate 20, and the columnar spacers 401 are disposed gradually more sparsely in accordance with the likeliness to be less crushable as separated from the center C and the vicinity. Therefore, the more effective and proper arrangement of the columnar spacers 401 can be implemented in the embodiment to keep the cell gap constant.

Moreover, in the modified embodiment, the semicircular area 503C has been described, but the invention is not limited to this structure. The arrangement density of the columnar spacers 401 as being gradually decreased is basically adaptable even though the area where the columnar spacers 401 have to be disposed densely has any shape. Of course as shown in FIG. 7, it is also easy to apply the idea of the embodiment to the electro-optic device having two liquid crystal inlets 52aa and 52ab.

In this connection, more generally describing the idea of the embodiment, the arrangement density of the columnar spacers 401 in the immediate center of the liquid crystal inlet 52a can be P [spacer/pixel], and the arrangement density of the columnar spacers in the places separate from the inlet 52a to a considerable extent other than in the vicinity of the liquid crystal inlet 52a can be Q [spacer/pixel]. There is the area where the columnar spacers are disposed at an arrangement density of X [spacer/pixel] that satisfies P>Q and P>X>Q. Further generalizing this, the area of arrangement densities of X1, X2, . . . Xn [spacer/pixel], where P>X1>X2>. . . >Xn>Q is satisfied can also be considered.

Circuit Configuration and Operations of the Electro-optic Device

Figure 11:
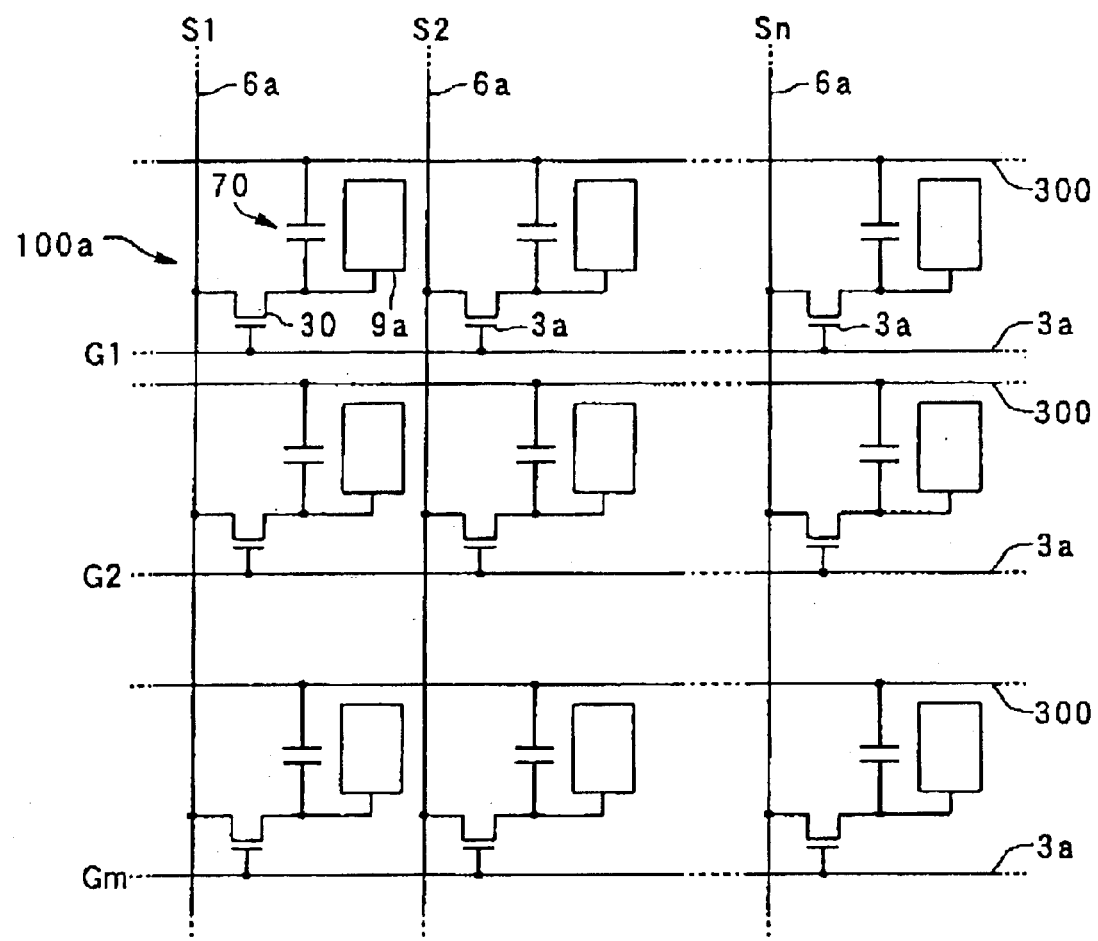
FIG. 11 is a circuit diagram illustrating the equivalent circuit of various elements and wiring lines disposed in a plurality of pixels in a matrix shape configuring the image display space in the electro-optic device of the embodiment of the invention.

Hereafter, the driving of the pixel electrodes 9a in the electro-optic device having the configuration above is described with reference to FIG. 11. FIG. 11 is an equivalent circuit of various elements and wiring lines in a plurality of pixels 100a formed in a matrix shape, which configure the image display space of the electro-optic device.

In FIG. 11, the pixel electrode 9a and a TFT 30 to switch the pixel electrode 9a are formed for each of the plurality of the pixels 100a, and the data line 6a to which the image signals are fed is electrically connected to the source of the TFT 30. It is acceptable to feed the image signals S1, S2, . . . Sn to be written in the data lines 6a in the order of the lines, or to feed at every group to a plurality of adjacent data lines 6a.

In addition, the scanning line 3a is electrically connected to the gate of the TFT 30. It is configured to apply the scan signals G1, G2, . . . Gm in pulse to the scanning lines 3a in the order of the lines at predetermined timing. The pixel electrode 9a is electrically connected to the drain of the TFT 30. The TFT 30 to be a switching element is closed for a fixed time, whereby the image signals S1, S2, . . . Sn fed from the data line 6a are written at predetermined timing.

The image signals S1, S2, . . . Sn at a predetermined level, which have been written through the pixel electrode 9a to liquid crystals as one example of the electro-optic material, are held for a fixed time between the pixel electrode 9a and the counter electrode 21 formed over the opposite substrate 20. The liquid crystals are varied in the alignment or order of molecules by the voltage levels to be applied, whereby light is modulated to allow the gray scale display. When it is in the normally white mode, the transmittance to the incident light is decreased according to the voltage applied at a unit of each pixel 100a, whereas when it is in the normally black mode, the transmittance to the incident light is increased according to the voltage applied at a unit of each pixel 100a. As a whole, the electro-optic device emits light having the contrast corresponding to the image signals.

Furthermore, in order to prevent or reduce the held image signals from leaking, a storage capacitor 70 is sometimes added in parallel to a liquid crystal capacitor formed between the pixel electrode 9a and the counter electrode 21. For example, the voltage of the pixel electrode 9a is held in the storage capacitor 70 for the time three digits longer than the time that the source voltage has been applied. Accordingly, the retention characteristics of charge are enhanced, and the electro-optic device of high contrast ratio can be implemented. Moreover, as the method for forming the storage capacitor 70, it may be either case of forming a volume line 300 exclusive therefor or of forming the storage capacitor 70 next to the scanning line 3a at the previous stage.

Practical Configuration of the TFT and the Periphery

Figure 12:
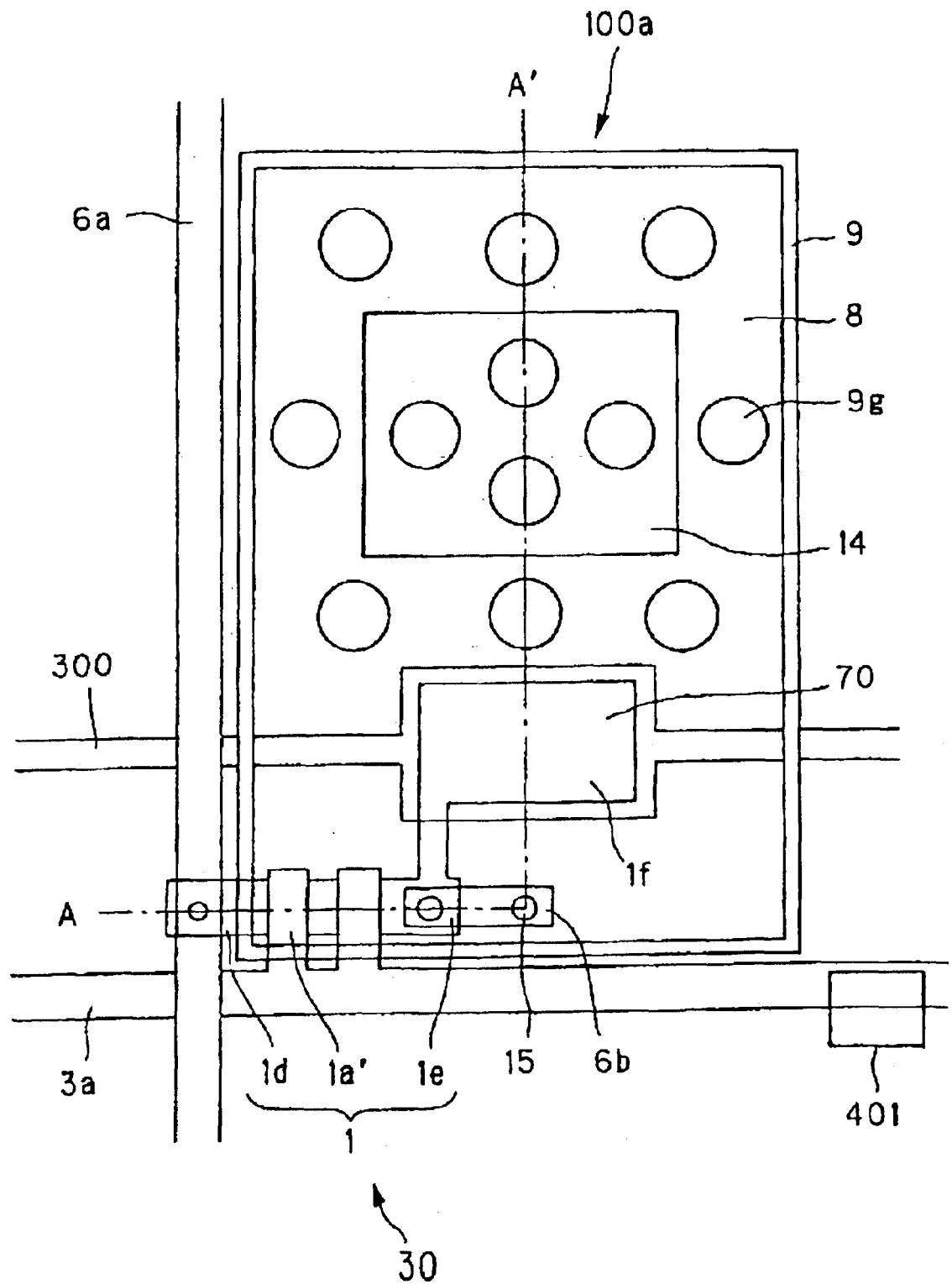
FIG. 12 is a plan view of a plurality of pixel groups adjacent each other over the TFT array substrate.
Figure 13:
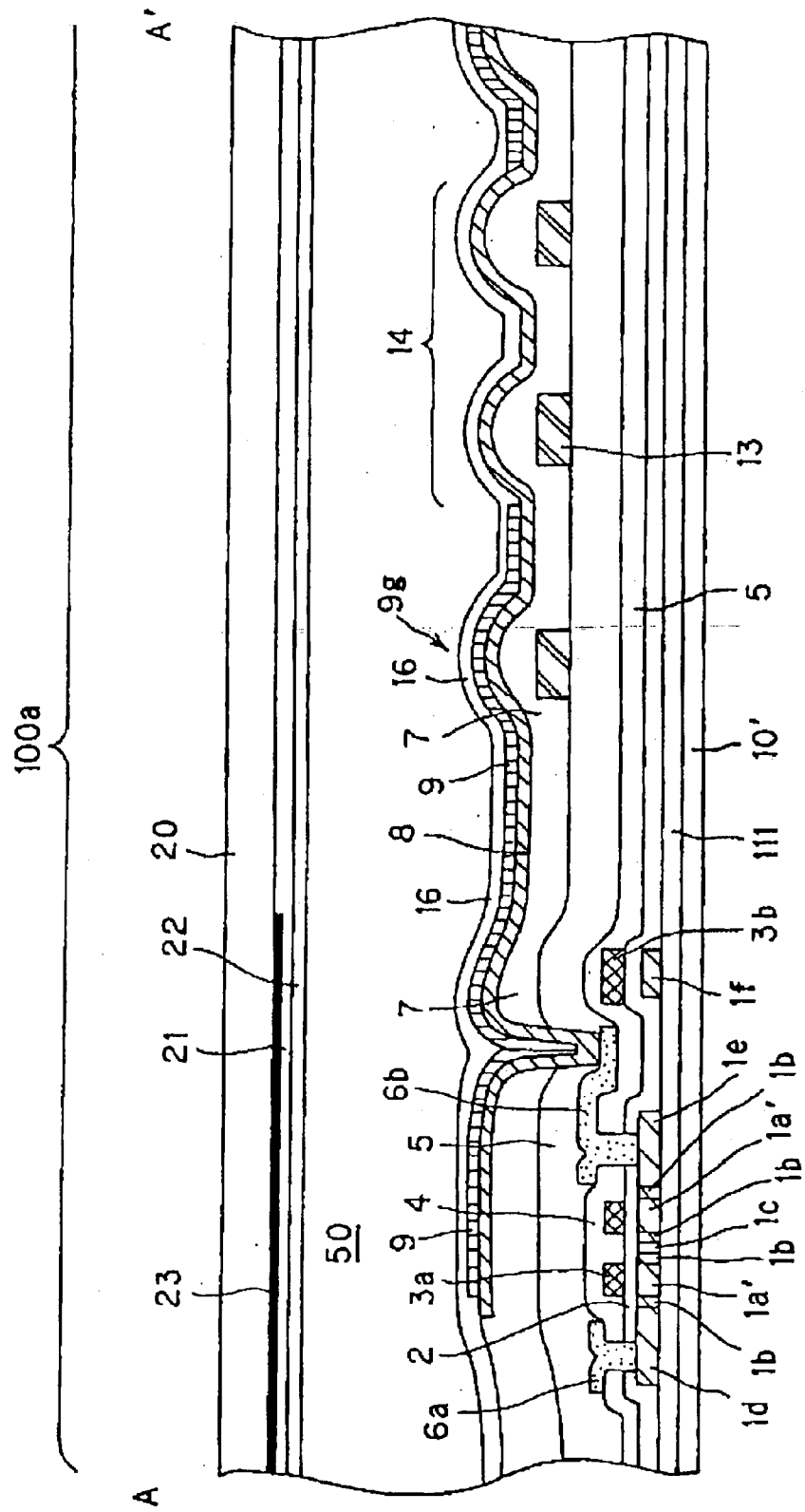
FIG. 13 is a cross-sectional view taken along plane A—A' shown in FIG. 12.

More practically, the pixel 100a as described above has the configuration shown in FIGS. 12 and 13. Here, FIG. 12 is a plan view of a plurality of the pixels adjacent each other over the TFT array substrate used in the second embodiment, and FIG. 13 is a cross-sectional view taken along plane A–A' shown in FIG. 12. However, in FIGS. 12 and 13, only one pixel is illustrated in detail.

In FIG. 12, over the TFT array substrate, a transparent electrode 8 and a reflecting electrode 9 are disposed in addition to the TFT 30, the scanning line 3a, the data line 6a, and the storage capacitor 70. Furthermore, the pixel electrode 9a includes both the transparent electrode 8a and the reflecting electrode 9.

The reflecting electrodes 9 are formed in a matrix shape over the TFT array substrate 10. The pixel switching TFT 30 is electrically connected to each of the reflecting electrodes 9 through the transparent electrode 8. Moreover, a transparent window 14 is formed in the reflecting electrode 9 as shown in FIG. 12. The area for the transparent window 14 is covered with the transparent electrode 8. The reflecting electrode 9 is configured of aluminum, silver or alloys of these, or a layered film of titanium, titanium nitride, molybdenum, and tantalum. The transparent electrode 8 is configured of ITO (indium-tin oxide).

In the meantime, under the reflecting electrode 9 and the transparent electrode 8, a bump-and-dip forming layer 13 and a bump-and-dip layer 7 thereabove are formed (both are not shown in FIG. 12) as shown in FIG. 13. The bump-and-dip forming layer 13 and the bump-and-dip layer 7 are formed of photosensitive resins, such as organic resins. Particularly, the former is the layer formed in a shape to include blocks dotted over the substrate, whereas the latter is the layer formed in a shape to cover throughout the substrate including such the bump-and-dip forming layer 13. Therefore, the surface of the bump-and-dip layer 7 is to be 'up and down' according to the dotted form of the blocks configuring the bump-and-dip forming layer 13. Consequently, a bump-and-dip pattern 9g is formed. FIG. 12 illustrates the bump-and-dip pattern 9g in circular shapes, illustrating that the circular portions are more projected toward the near side of the paper of the drawing than other portions.

More specifically, on the far side of the paper of the drawing in the circular portions, the bump-and-dip layer 7 and the blocks are formed (see FIG. 13).

In the electro-optic device of the second embodiment having such a configuration, the transparent electrode 8 and the transparent window 14 are utilized, whereby the image display in the transmission mode is allowed, and the reflecting electrode 9, the bump forming layer 13, the bump-and-dip layer 7 and the bump-and-dip pattern 9g are utilized, whereby the image display in the reflection mode is enabled. More specifically, the area defined by the former configuration is the transparent area that the light emitted from an internal light source, not shown, is transmitted from the far side to the near side of the paper of FIG. 12. The area defined by the latter configuration is the reflection area that the light reaches the reflecting electrode 9 from the near side of the paper and then again reflects to the near side of the paper. In addition, particularly in the latter case, the bump-and-dip pattern 9g causes the scatter reflection of light, and thus the dependency of the image on the field of view angle can be reduced.

Then, back to the FIG. 12, along the longitudinal and transverse borders of the area forming the reflecting electrode 9, the data line 6a, the scanning line 3a and the volume line 300 are formed, and the TFT 30 is connected to the data line 6a and the volume line 300. That is, the data line 6a is electrically connected to a high-concentration source region 1d of the TFT 30 through a contact hole 15, and the transparent electrode 8 is electrically connected to a high-concentration drain region 1e of the TFT 30 through the contact hole 15 and a source line 6b. In addition, the scanning line 3a is extended as facing to a channel region 1a' of the TFT 30.

Furthermore, the storage capacitor 70 has a configuration in which an extended portion 1f of a semiconductor film 1 to form the pixel switching TFT 30 is made conductive is formed into a lower electrode, and this lower electrode is overlaid with the volume line 300 in the same layer as the scanning line 3a as an upper electrode.

In this connection, as already described with reference to FIGS. 3 to 5, the embodiment is provided such that the columnar spacer 401 is disposed at the position corresponding to the corner part of the reflecting electrode 9 (see FIG. 12).

Moreover, other than the description above in FIG. 13, a base protection film 111 made of a silicon oxide film (insulating film) having a thickness of 100 to 500 nm is formed over the TFT array substrate 10. Over the base protection film 111 and the TFT 30, a first interlayer dielectric 4 made of a silicon oxide film having a thickness of 300 to 800 nm is formed. Over the first interlayer dielectric 4, a second interlayer dielectric 5 (surface protection film) made of a silicon nitride film having a thickness of 100 to 800 nm is formed. However, depending on the cases, the second interlayer dielectric 5 may not be formed. Besides, on the TFT array substrate 10, the alignment layer 16 is formed as the uppermost layer. In addition to this, in FIG. 13, contact holes to electrically connect various components are formed. In the meantime, on the opposite substrate 20, the shading layer 23 extending as if runs through a space between the pixels 100a, and the counter electrode 21 and the alignment layer 22 formed throughout the substrate surface are formed as laminated in this order.

Electronic Device

The electro-optic device thus configured can be used as the display part of various electronic devices. One example thereof is specifically described with reference to FIGS. 14 to 16.

Figure 14:
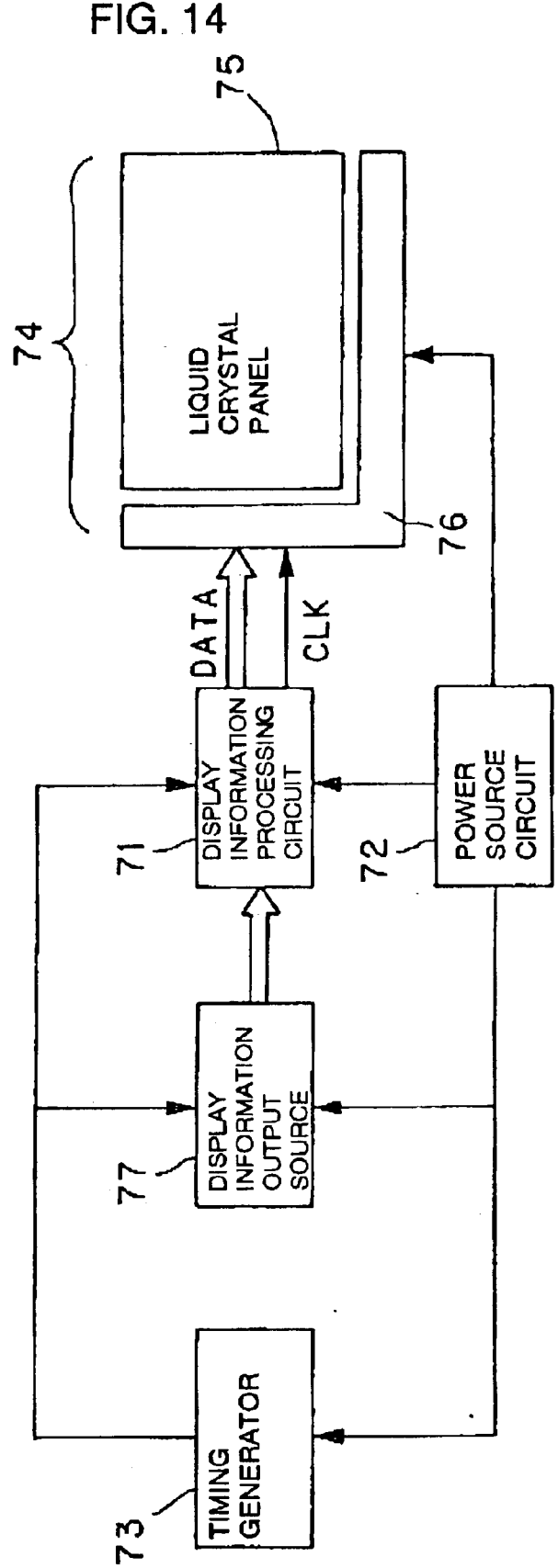
FIG. 14 is a schematic illustrating the circuit configuration of the electronic device using the electro-optic device of the invention as a display device.

FIG. 14 is a schematic illustrating the circuit configuration of an electronic device using the electro-optic device in the invention as the display device.

In FIG. 14, the electronic device has a display information output source 77, a display information processing circuit 71, a timing generator 73, a power source circuit 72, and a liquid crystal display device 74. In addition, the liquid crystal display device 74 has a liquid crystal display panel 75 and a driving circuit 76. The electro-optic device described above can be used as the liquid crystal device 74.

The display information output source 70 has a memory, such as a ROM (Read Only Memory) and a RAM (Random Access Memory), a storage unit, such as various discs, and a tuning circuit to synchronously output the digital image signal, in which display information, such as the image signal of a predetermined format, is fed to the display information processing circuit 71 based on various clock signals generated by the timing generator 73.

The display information processing circuit 71 has various related art circuits, such as a serial-parallel inverter circuit, an amplifying/inverting circuit, a rotation circuit, a gamma correction circuit, and a clamp circuit, which processes the inputted display information to feed the image signal to the drive circuit 76 with the clock signal CLK. The power source circuit 72 feeds a predetermined voltage to various components.

Figure 15:
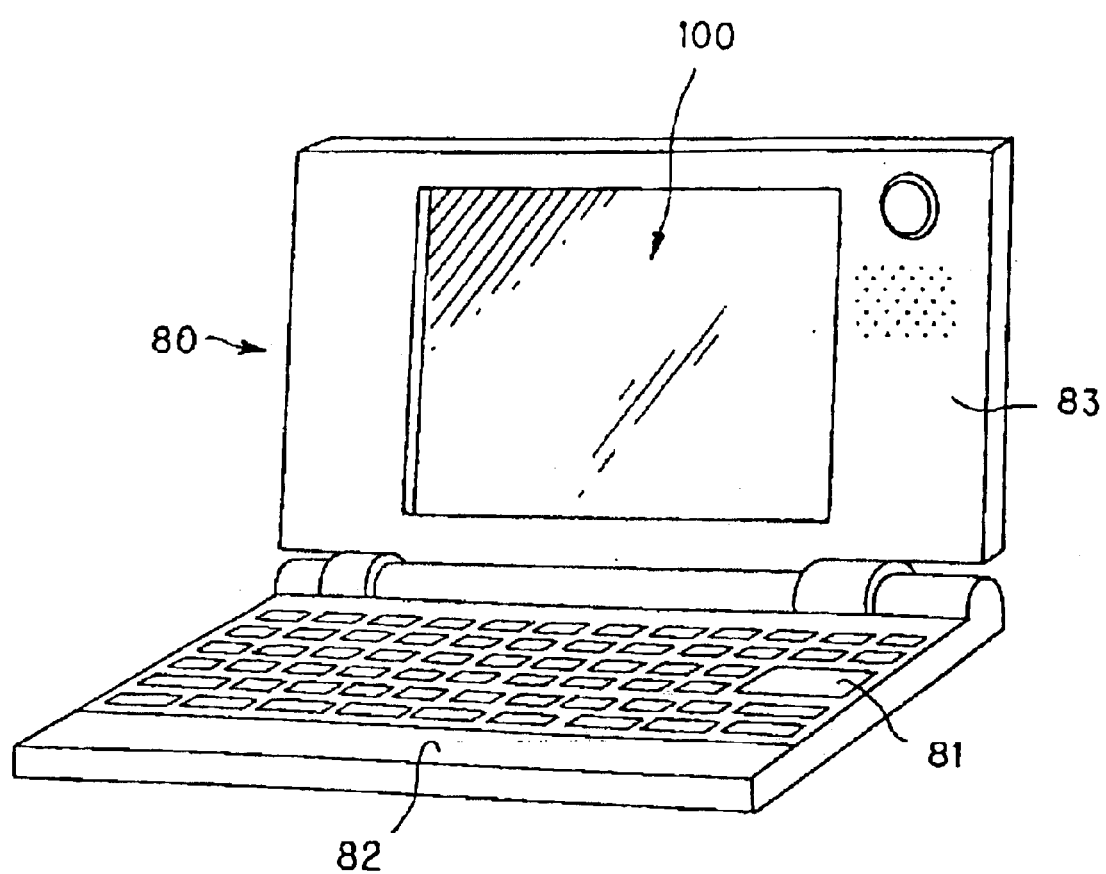
FIG. 15 is a perspective view illustrating a mobile personal computer as one example of an electronic device using the electro-optic device of the invention.

FIG. 15 illustrates a mobile personal computer as one exemplary embodiment of the electronic device in the invention. A personal computer 80 has a main body part 82 equipped with a keyboard 81 and a liquid crystal display unit 83. The liquid crystal display unit 83 is configured to include the electro-optic device 100.

Figure 16:
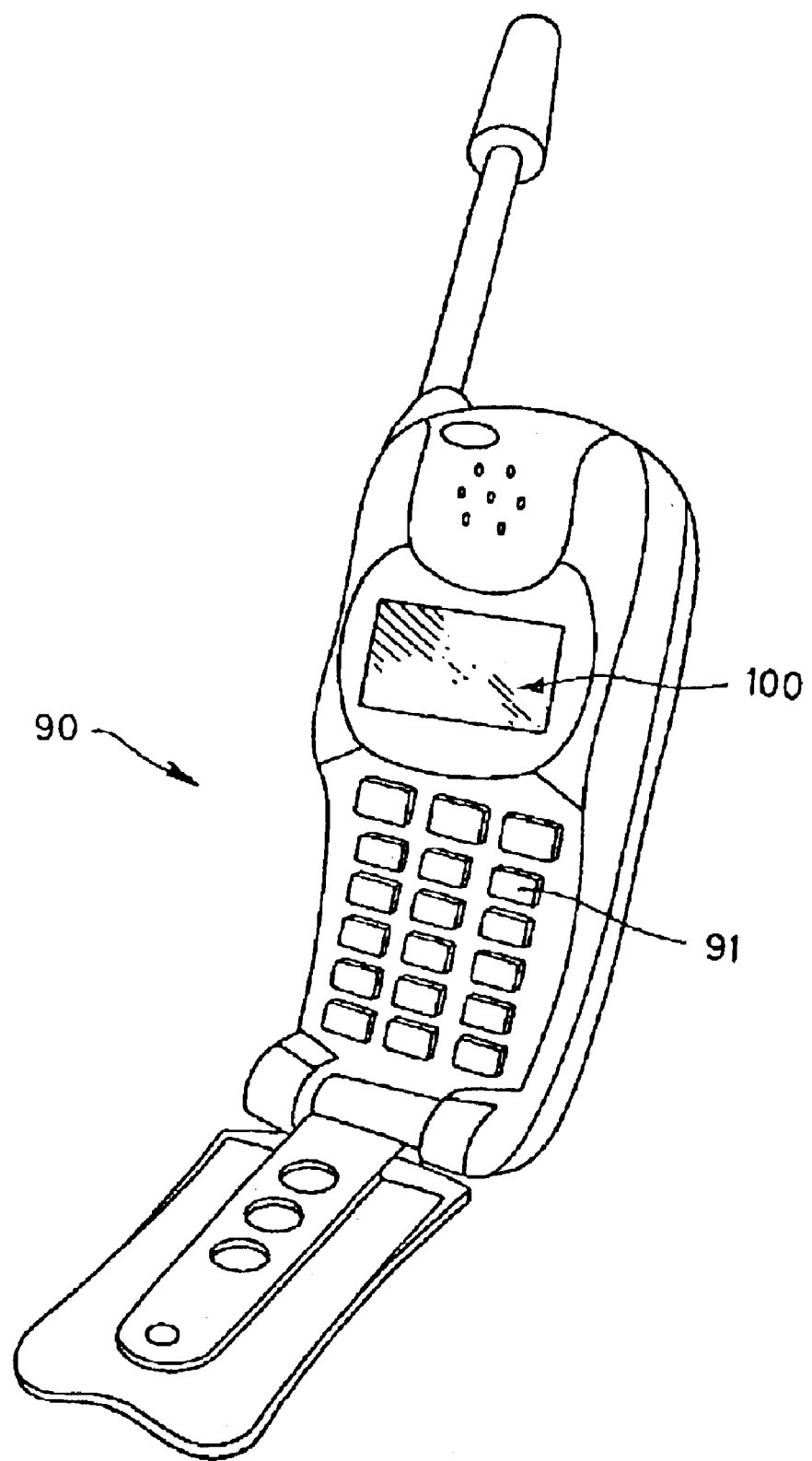
FIG. 16 is a perspective view of a cellular phone as another example of an electronic device using the electro-optic device of the invention.

FIG. 16 illustrates a cellular phone as another exemplary electronic device. A cellular phone 90 shown here has a plurality of manual operation buttons 91 and a display part formed of the electro-optic device 100.

The invention is not limited to the embodiments above, which can be modified properly within the scope of the teachings of the invention readable from claims and the specification, or within the scope not deviating the idea of the invention. The electro-optic devices and the electronic devices accompanying the modifications are also covered within the field of the invention.

What is claimed is:

1. An electro-optic device, comprising:
   an electro-optic material;
   a pair of substrates sandwiching the electro-optic material;

a sealing material substantially sealing an inner space between the pair of substrates, the sealing material being formed with an inlet to communicate the inner space between the pair of substrates with an external space exterior to the sealing material and the pair of substrates;

pixel electrodes and switching elements provided over a first substrate which is one of the pair of substrates; and a plurality of columnar spacers scattered within surfaces of the pair of substrates facing each other, the columnar spacers being disposed in a one-to-one correspondence with all of the pixel electrodes only within a predetermined region in a vicinity of the inlet and more sparsely beyond the predetermined region within the surfaces.

2. The electro-optic device according to claim 1, columnar spacers disposed in the vicinity of the inlet being disposed more densely inside a semicircular area centering the inlet within the surfaces.

3. The electro-optic device according to claim 1, further including a shading layer formed in the matrix shape disposed over at least one of the first substrate and a second substrate which is the other of the pair of the substrates, the columnar spacers being disposed inside a width of the shading layer.

4. An electro-optic device, comprising:

an electro-optic material;

a pair of substrates sandwiching the electro-optic material;

a sealing material substantially sealing an inner space between the pair of substrates, the sealing material being formed with an inlet to communicate the inner space between the pair of substrates with an external space exterior to the sealing material and the pair of substrates;

pixel electrodes provided over a first substrate of the pair of substrates, the pixel electrodes being separated from each other by first band-shaped sections and second band-shaped sections that run substantially perpendicular to the first band-shaped sections, the first and second band-shaped sections intersecting at square-shaped crossing parts; and a plurality of columnar spacers scattered within surfaces of the pair of substrates facing each other, the columnar spacers being disposed more densely in a vicinity of the inlet and more sparsely beyond the vicinity of the inlet within the surfaces, further including an alignment layer formed on surfaces of the pair of the substrates facing the electro-optic material, each columnar spacer being disposed at a corner of a square-shaped crossing part.

5. The electro-optic device according to claim 4, further including an alignment layer formed with a rubbing process over one of the pair of the substrates where the columnar spacers are disposed, the corner part being located at a corner of an upstream side in the rubbing direction of the crossing part over the substrate where the columnar spacers are disposed.

6. The electro-optic device according to claim 4, further including a plurality of the inlets, and the columnar spacers being disposed more densely for each of the plurality of inlets within the surfaces.

7. An electro-optic device, comprising:

an electro-optic material;

a pair of substrates sandwiching the electro-optic material;

a sealing material substantially sealing an inner space between the pair of substrates, the sealing material being formed with an inlet to communicate the inner space between the pair of substrates with an external space exterior to the sealing material and the pair of substrates;

a plurality of scanning lines running substantially parallel to each other;

a plurality of data lines running substantially parallel to each other and perpendicular to the scanning lines, the data lines intersecting the scanning lines at intersecting points arranged in a matrix;

a plurality of columnar spacers scattered within surfaces of the pair of substrates facing each other, the columnar spacers being disposed within the surfaces; and pixel electrodes arranged one for each intersecting point in the matrix, the pixel electrodes being disposed over one of the substrates, the columnar spacers in a vicinity of the inlet being disposed in a one-to-one correspondence with all of the pixel electrodes, the columnar spacers in other locations being disposed as one spacer for 2 to 30 of the pixel electrodes.

8. The electro-optic device according to claim 1, an arrangement density of the columnar spacers gradually becoming reduced from a center of the inlet toward an exterior of the center as the substrate is viewed in a plan view.

9. An electronic device, comprising:

the electro-optic device according to claim 1.

10. An electro-optical device, comprising:

an electro-optical material;

a pair of substrates sandwiching the electro-optical material;

a sealing material substantially sealing an inner space between the pair of substrates, the sealing material being formed with an inlet that brings the inner space between the pair of substrates into fluid communication with an external space exterior to the sealing material and the pair of substrates;

a plurality of scanning lines running substantially parallel to each other;

a plurality of data lines running substantially parallel to each other and perpendicular to the scanning lines, the data lines intersecting the scanning lines at intersecting points arranged in a matrix;

pixel electrodes and switching elements provided over a first substrate which is one of the pair of substrates, the pixel electrodes being disposed one for each intersecting point in the matrix, the switching elements being connected to each of the pixel electrodes; and a plurality of columnar spacers scattered within surfaces of the pair of substrates facing each other, the columnar spacers being disposed in a one-to-one correspondence with all of the pixel electrodes in a vicinity of the inlet and more sparsely beyond the vicinity of the inlet within the surfaces.

* * * * *